US010459132B2

(12) United States Patent
Yamamoto et al.

(10) Patent No.: US 10,459,132 B2
(45) Date of Patent: Oct. 29, 2019

(54) OPTICAL MEMBER, METHOD OF MANUFACTURING OPTICAL MEMBER, AND IMAGE DISPLAY DEVICE

(71) Applicant: FUJIFILM Corporation, Tokyo (JP)

(72) Inventors: Akira Yamamoto, Kanagawa (JP); Yoji Ito, Kanagawa (JP); Michio Nagai, Kanagawa (JP); Daisuke Kashiwagi, Kanagawa (JP); Nobuhiko Ichihara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 75 days.

(21) Appl. No.: 15/704,572

(22) Filed: Sep. 14, 2017

(65) Prior Publication Data

US 2018/0003869 A1 Jan. 4, 2018

Related U.S. Application Data

(63) Continuation of application No. PCT/JP2016/060302, filed on Mar. 30, 2016.

(30) Foreign Application Priority Data

Mar. 30, 2015 (JP) .................. 2015-069697

(51) Int. Cl.
*G02B 5/136* (2006.01)
*G02B 1/02* (2006.01)
(Continued)

(52) U.S. Cl.
CPC .............. *G02B 5/136* (2013.01); *G02B 1/02* (2013.01); *G02B 5/0226* (2013.01); *G02B 5/208* (2013.01);
(Continued)

(58) Field of Classification Search
CPC ...... G02B 5/136; G02B 5/208; G02B 5/0226; G02B 1/02; G02B 5/0284; G02B 5/26; G06F 3/0317; G02F 2201/343
See application file for complete search history.

(56) References Cited

U.S. PATENT DOCUMENTS

| 2008/0182041 A1 | 7/2008 | Sekine et al. |
| 2008/0252064 A1 | 10/2008 | Sekine et al. |
| 2016/0170111 A1* | 6/2016 | Nagai .................. G02B 5/3016 349/194 |

FOREIGN PATENT DOCUMENTS

| JP | 2002-002103 A | 1/2002 |
| JP | 2008-180798 A | 8/2008 |

(Continued)

OTHER PUBLICATIONS

Office Action issued by the Japanese Patent Office dated Aug. 14, 2018, in connection with corresponding Japanese Patent Application No. 2017-510074.

(Continued)

*Primary Examiner* — Phu Vu
(74) *Attorney, Agent, or Firm* — Edwards Neils LLC; Jean C. Edwards, Esq.

(57) ABSTRACT

An optical member includes: a substrate; and a dot formed on a surface of the substrate. The dot has wavelength selective reflecting properties, and a cholesteric structure which has a stripe pattern including bright and dark portions in a cross-sectional view of the dot when observed with a scanning electron microscope. A surface shape of the dot opposite to the substrate in a cross-section of the dot in a thickness direction has at least one inflection point. In the cross-section, an angle between a normal line perpendicular to a line, formed using a first dark portion from a surface of the dot opposite to the substrate, and the surface of the dot, is in a range of 70° to 90°. A proportion of a retroreflective (Continued)

area of the optical member is high when observed after light irradiation from an oblique direction to a normal direction perpendicular to the optical member.

18 Claims, 4 Drawing Sheets

(51) Int. Cl.
- *G02B 5/02* (2006.01)
- *G02B 5/20* (2006.01)
- *G06F 3/03* (2006.01)
- *G02B 5/26* (2006.01)

(52) U.S. Cl.
CPC .......... *G06F 3/0317* (2013.01); *G02B 5/0284* (2013.01); *G02B 5/26* (2013.01); *G02F 2201/343* (2013.01)

(56) References Cited

FOREIGN PATENT DOCUMENTS

| | | |
|---|---|---|
| JP | 2008-225727 A | 9/2008 |
| JP | 2008-250541 A | 10/2008 |
| JP | 2010-085532 A | 4/2010 |

OTHER PUBLICATIONS

International Search Report issued in PCT/JP2016/060302 dated Jun. 28, 2016.
Written Opinion issued inPCT/JP2016/060302 dated Jun. 28, 2016.
International Preliminary Report on Patentability completed by WIPO dated Jul. 24, 2017, in connection with International Patent Application No. PCT/JP2016/060302.

\* cited by examiner

OPTICAL MEMBER, METHOD OF MANUFACTURING OPTICAL MEMBER, AND IMAGE DISPLAY DEVICE

CROSS-REFERENCE TO RELATED APPLICATIONS

This application is a Continuation of PCT International Application No. PCT/JP2016/060302, filed on Mar. 30, 2016, which was published under PCT Article 21(2) in Japanese, and which claims priority under 35 U.S.C. Section 119(a) to Japanese Patent Application No. 2015-069697 filed on Mar. 30, 2015. The above applications are hereby expressly incorporated by reference, in their entirety, into the present application.

BACKGROUND OF THE INVENTION

1. Field of the Invention

The present invention relates to an optical member, a method of manufacturing an optical member, and an image display device. More specifically, the present invention relates to an optical member in which the proportion of a retroreflective area is high when the optical member is observed after light irradiation from a direction which is oblique to a normal direction perpendicular to the optical member, a method of manufacturing the optical member, and an image display device in which the optical member is used.

2. Description of the Related Art

A material having a cholesteric structure has wavelength selective reflecting properties and, due to these properties, has been used as materials for forming various optical members. For example, JP2008-225727A discloses a reflection pattern-printed transparent sheet that is mounted to face a front surface of a medium on which an image can be displayed, the transparent sheet including: a transparent substrate; and a transparent pattern having invisible light reflecting properties that is printed on a surface of the transparent substrate, in which an ink which forms the transparent pattern includes an invisible light reflecting material, the invisible light reflecting material has wavelength selective reflecting properties in an invisible light reflecting wavelength range, and a thickness of the transparent pattern is 6 to 20 μm. In particular, JP2008-225727A describes an aspect where the transparent pattern has a multi-layer structure including a fixed repeating cycle and where the multi-layer structure is formed of a liquid crystal material having a fixed cholesteric structure. In addition, when mounted on an image-displayable device and used in combination with an input terminal (for example, a so-called electronic pen) capable of irradiating and detecting invisible light such as infrared light, the reflection pattern-printed transparent sheet described in JP2008-225727A can be used as a member providing coordinate detecting means which is suitably applicable to a data input system in which data can be handwritten directly on a screen of a display device.

SUMMARY OF THE INVENTION

When the optical member such as the reflection pattern-printed transparent sheet described in JP2008-225727A is used in combination with an electronic pen or the like which is used in a state where it is tilted obliquely to the optical member, it is important to increase the sensitivity of reflected light from the optical member even in a case where light incident from various directions including a direction which is oblique to a normal direction perpendicular to the optical member is detected or observed in the same direction.

In addition, in the optical member such as the reflection pattern-printed transparent sheet described in JP2008-225727A, it is important to reduce the height of the transparent pattern portion (hereinafter, also referred to as "dot") formed of materials including the invisible light reflecting material from the viewpoint of reducing the thickness of an image display device.

The present inventors performed an investigation on the proportion of a retroreflective area of a dot when the optical member is observed after light irradiation from a direction which is oblique to a normal direction perpendicular to the reflection pattern-printed transparent sheet described in JP2008-225727A, and found that reflected light from the optical member cannot be read with high sensitivity due to a low proportion of the retroreflective area. Further, it was also found that, in a case where the height of the dot is reduced, the proportion of a retroreflective area of the dot is further reduced.

An object to be achieved by the present invention is to provide an optical member in which the proportion of a retroreflective area is high when the optical member is observed after light irradiation from a direction which is oblique to a normal direction perpendicular to the optical member.

In general, in a case where the maximum height of a dot increases, a retroreflective area (an area where retroreflection occurs) increases when an optical member is observed after light irradiation from a direction which is oblique to a normal direction perpendicular to the optical member. However, the configuration of increasing the maximum height of a dot to increase a retroreflective area when an optical member is observed after light irradiation from a direction which is oblique to a normal direction perpendicular to the optical member is contrary to the demand to reduce the thickness of a dot, which is not preferable. In order to satisfy the demand to reduce the thickness of a dot, it is important to increase the proportion of a retroreflective area when an optical member is observed after light irradiation from a direction which is oblique to a normal direction perpendicular to the optical member.

Therefore, in order to achieve the above-described object, the present inventors performed an investigation on the improvement of a shape of a transparent pattern formed of an invisible light reflecting material. Here, JP2008-225727A has the expression "the three-dimensional shape of a dot is not particularly limited and is typically a disk shape, but may be an elliptical hemispherical shape or a concave shape". However, in a dot having a disk shape, an elliptical hemispherical, or a concave shape, the proportion of a retroreflective area is low. In JP2008-225727A regarding the dot shape, oblique light reflection from a side surface of a concave portion is not described, and only light reflection from a concave inner surface of a concave portion is described. In a cross-section of a dot having a concave shape in a thickness direction, a surface shape of the dot opposite to a substrate does not have an inflection point. In addition, in a dot having a cholesteric structure, the highest wavelength selective reflecting properties are exhibited in a helical axis direction of the cholesteric structure. However, JP2008-225727A does not describe a method of aligning a helical axis direction of a cholesteric structure of a dot having a curved surface so as to be perpendicular to a dot surface.

On the other hand, JP2014-171956A, JP2012-199330A, and JP2008-040119A describe that a coating film can be caused to have a coffee-stain shape using a coffee-stain phenomenon. However, JP2014-171956A, JP2012-199330A, and JP2008-040119A do not a technique of forming a coating film in a coffee-stain shape using a material capable of forming a cholesteric structure. Therefore, a method of applying the shape of the coating film described in JP2014-171956A, JP2012-199330A, and JP2008-040119A to the dot having a cholesteric structure described in JP2008-225727A cannot be obtained from the description of JP2014-171956A, JP2012-199330A, and JP2008-040119A.

On the other hand, the present inventors found that the above-described object can be achieved by causing a dot to have a specific shape such as a coffee-stain shape and aligning a helical axis direction of a cholesteric structure of the dot having a cured surface so as to be substantially perpendicular to a dot surface, thereby completing the present invention.

Preferable aspects of the present invention for achieving the above-described object are as follows.

[1] An optical member comprising:
a substrate; and
a dot that is formed on a surface of the substrate,
in which the dot has wavelength selective reflecting properties,
the dot has a cholesteric structure,
the cholesteric structure has a stripe pattern including bright portions and dark portions in a cross-sectional view of the dot when observed with a scanning electron microscope,
a surface shape of the dot opposite to the substrate in a cross-section of the dot in a thickness direction has at least one inflection point, and
in the cross-section of the dot in the thickness direction, an angle between a normal line perpendicular to a line, which is formed using a first dark portion from a surface of the dot opposite to the substrate, and the surface of the dot is in a range of 70° to 90°.

[2] In the optical member according to [1], it is preferable that a maximum height of the dot is less than 20 µm.

[3] In the optical member according to [1] or [2], it is preferable that the following Expression 1 is satisfied.

$$(Hc/Hmax) < 1 \quad \text{Expression 1}$$

in Expression 1, Hmax represents the maximum height of the dot, Hc represents a height at a center of the dot in the cross-section of the dot in the thickness direction, and the center of the dot is the center of gravity of an orthogonal projection of the dot from the normal direction perpendicular to the substrate.

[4] In the optical member according to any one of [1] to [3], it is preferable that the following Expression 2 is satisfied, $$0.16 < (Hc/Hmax) < 1 \quad \text{Expression 2}$$

in Expression 2, Hmax represents the maximum height of the dot, Hc represents a height at a center of the dot in the cross-section of the dot in the thickness direction, and the center of the dot is the center of gravity of an orthogonal projection of the dot from the normal direction perpendicular to the substrate.

[5] In the optical member according to any one of [1] to [4], it is preferable that the following Expression 3 is satisfied, $$0.25 < (Hc/Hmax) < 1 \quad \text{Expression 3}$$

in Expression 3, Hmax represents the maximum height of the dot, Hc represents a height at a center of the dot in the cross-section of the dot in the thickness direction, and the center of the dot is the center of gravity of an orthogonal projection of the dot from the normal direction perpendicular to the substrate.

[6] In the optical member according to any one of [1] to [5], it is preferable that the number of dot surfaces perpendicular to a direction, which is tilted from the normal direction perpendicular to the substrate to one arbitrary orientation by 60°, is two or more.

[7] In the optical member according to any one of [1] to [6], it is preferable that the dot is formed of a liquid crystal material having a cholesteric structure and that the liquid crystal material includes a surfactant.

[8] In the optical member according to [7], it is preferable that the surfactant is a fluorine-containing polymer compound.

[9] In the optical member according to [7] or [8], it is preferable that the liquid crystal material is a material obtained by curing a liquid crystal composition including a liquid crystal compound, a chiral agent, and the surfactant.

[10] In the optical member according to any one of [1] to [9], it is preferable that a plurality of the dots are provided in a pattern shape on the surface of the substrate.

[11] In the optical member according to any one of [1] or [10], it is preferable that a diameter of the dot is 20 to 200 µm.

[12] In the optical member according to any one of [1] to [11], it is preferable that, in an end portion of the dot, an angle between a surface of the dot, which is opposite to the substrate, and the substrate is 27° to 62°.

[13] The optical member according to any one of [1] to [12], it is preferable that the dot has wavelength selective reflecting properties in which a center wavelength is present in an infrared range.

[14] In the optical member according to [13], it is preferable that the dot has wavelength selective reflecting properties in which a center wavelength is present at a wavelength of 800 to 950 nm.

[15] The optical member according to any one of [1] to [14] which is transparent in a visible range.

[16] A method of manufacturing an optical member, the method comprising:
disposing a dot having wavelength selective reflecting properties on a surface of a substrate,
in which the substrate is heated to a temperature of 40° C. or higher.

[17] A method of manufacturing the optical member according to any one of [1] to [15], the method comprising:
disposing a dot having wavelength selective reflecting properties on a surface of a substrate.

[18] An optical member which is manufactured using the method according to [16] or [17].

[19] An image display device comprising:
the optical member according to any one of [1] to [15] and [18].

According to the present invention, an optical member can be provided in which the proportion of a retroreflective area is high when the optical member is observed after light irradiation from a direction which is oblique to a normal direction perpendicular to the optical member.

DESCRIPTION OF THE PREFERRED EMBODIMENTS

Figure 1:
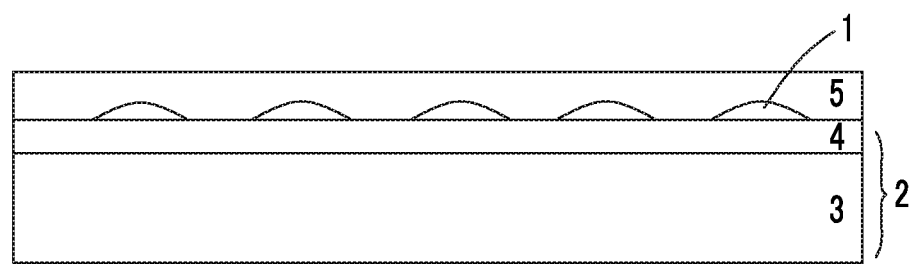
FIG. 1 is a schematic diagram showing a cross-section of an example of an optical member according to the present invention.

Hereinafter, the present invention will be described in detail.

In this specification, numerical ranges represented by "to" include numerical values before and after "to" as lower limit values and upper limit values.

In this specification, for example, unless specified otherwise, an angle such as "45°", "parallel", "perpendicular", or "orthogonal" represents that a difference from an exact angle is less than 5 degrees. The difference from an exact angle is preferably less than 4 degrees and more preferably less than 3 degrees.

In this specification, "(meth)acrylate" represents "either or both of acrylate and methacrylate".

In this specification, the meaning of "the same" includes a case where an error range is generally allowable in the technical field. In addition, in this specification, the meaning of "all", "entire", or "entire surface" includes not only 100% but also a case where an error range is generally allowable in the technical field, for example, 99% or more, 95% or more, or 90% or more.

Visible light refers to light which can be observed by human eyes among electromagnetic waves and refers to light in a wavelength range of 380 nm to 780 nm Invisible light refers to light in a wavelength range of shorter than 380 nm or longer than 780 nm.

Among infrared light rays, near infrared light refers to an electromagnetic wave in a wavelength range of 780 nm to 2500 nm. Ultraviolet light refers to light in a wavelength range of 10 to 380 nm.

A reflection maximum wavelength (also called "reflection peak wavelength") of a cholesteric structure and a full width at half maximum thereof can be obtained as follows.

In a case where a transmission spectrum of a cholesteric structure is measured using a spectrophotometer UV3150 (manufactured by Shimadzu Corporation), a reduction peak in the transmittance is shown in a selective reflection range. In a case where, among two wavelength values at which the height of the transmittance is half of a maximum peak height in the transmission spectrum, a wavelength value on the short wavelength side is represented by $\lambda 1$ (nm) and a wavelength value on the long wavelength side is represented by $\lambda 2$ (nm), the reflection center wavelength and the full width at half maximum are represented by the following expressions.

Reflection Center Wavelength=$(\lambda 1+\lambda 2)/2$

Full Width at Half Maximum=$(\lambda 2-\lambda 1)$

In a case where the reflection maximum wavelength of a cholesteric structure cannot be read from data, the reflection center wavelength obtained using the above-described method is used instead of the reflection maximum wavelength.

In this specification, retroreflection refers to reflection in which incident light is reflected in an incidence direction.

[Optical Member]

An optical member according to the present invention includes:

a substrate; and a dot that is formed on a surface of the substrate, in which the dot has wavelength selective reflecting properties, the dot has a cholesteric structure, the cholesteric structure has a stripe pattern including bright portions and dark portions in a cross-sectional view of the dot when observed with a scanning electron microscope, a surface shape of the dot opposite to the substrate in a cross-section of the dot in a thickness direction has at least one inflection point, and in the cross-section of the dot in the thickness direction, an angle between a normal line perpendicular to a line, which is formed using a first dark portion from a surface of the dot opposite to the substrate, and the surface of the dot is in a range of 70° to 90°.

By the optical member according to the present invention adopting the above-described configuration, the proportion of a retroreflective area is high when the optical member is observed after light irradiation from a direction which is oblique to a normal direction perpendicular to the optical member.

Figure 4:
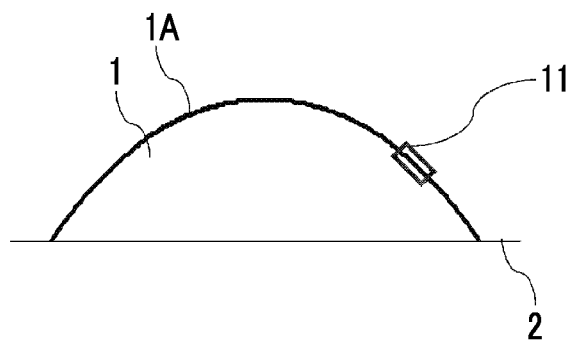
FIG. 4 is a schematic diagram showing a cross-section of a dot having a dome shape which is outside of the scope of the present invention

Here, the shape of a dot having a cholesteric structure which is formed using a method of the related art described in JP2008-225727A or the like is a dome shape shown in FIG. 4. FIG. 4 is a schematic diagram showing a cross-section of a dot having a dome shape which is outside of the scope of the present invention In a cross-section of a dot 1 shown in FIG. 4 in a thickness direction, a surface shape 1A of the dot 1 opposite to a substrate 2 does not have an inflection point 12. As a result, the number of dot surfaces 11 perpendicular to a direction which is tilted from the normal direction perpendicular to the substrate to one arbitrary orientation by 60° is only one. Therefore, the proportion of a retroreflective area is low when the optical member is observed after light irradiation from a direction which is oblique to a normal direction perpendicular to the optical member.

Figure 5:
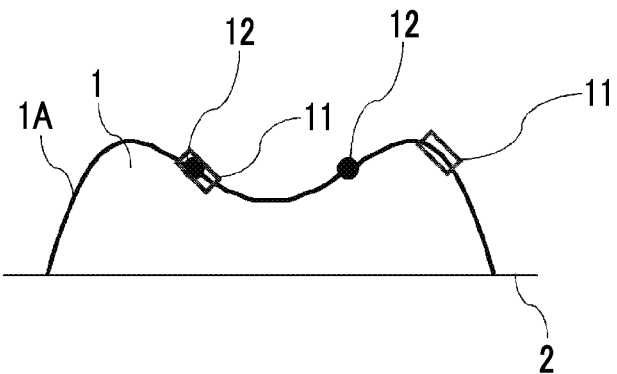
FIG. 5 is a schematic diagram showing a cross-section of an example of a dot having a coffee-stain shape which can be used in the optical member according to the present invention.
Figure 6:
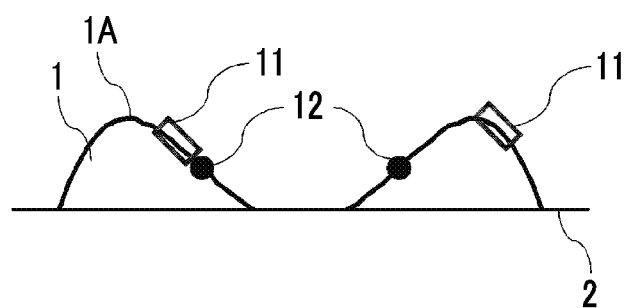
FIG. 6 is a schematic diagram showing a cross-section of an example of a dot having a doughnut shape which can be used in the optical member according to the present invention.
Figure 7:
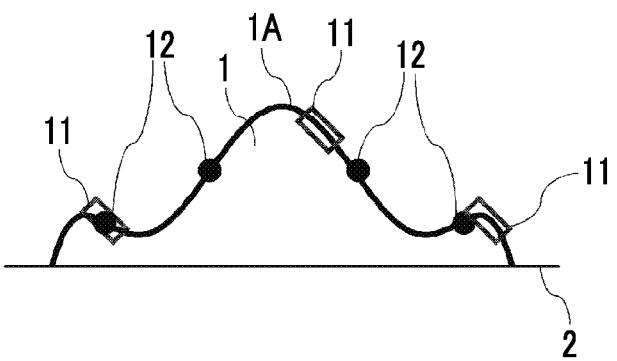
FIG. 7 is a schematic diagram showing a cross-section of an example of a dot having a Mexican hat shape which can be used in the optical member according to the present invention.

On the other hand, in the optical member according to the present invention, a surface shape of the dot opposite to the substrate in a cross-section of the dot in a thickness direction has at least one inflection point. FIGS. 5 to 7 show examples of dots which can be used in the optical member according to the present invention.

FIG. 5 is a schematic diagram showing a cross-section of an example of a dot having a coffee-stain shape which can be used in the optical member according to the present invention. In a cross-section of the dot 1 shown in FIG. 5 in a thickness direction, the surface shape 1A of the dot 1 opposite to the substrate 2 have two inflection points 12. As a result, the number of dot surfaces 11 perpendicular to a direction which is tilted from the normal direction perpendicular to the substrate to one arbitrary orientation by 60° is two. Therefore, the proportion of a retroreflective area is higher than that in the dot shown in FIG. 4 when the optical member is observed after light irradiation from a direction which is oblique to a normal direction perpendicular to the optical member.

FIG. 6 is a schematic diagram showing a cross-section of an example of a dot having a doughnut shape which can be used in the optical member according to the present invention. In a cross-section of the dot 1 shown in FIG. 6 in a thickness direction, the surface shape 1A of the dot 1 opposite to the substrate 2 have two inflection points 12. As a result, the number of dot surfaces 11 perpendicular to a direction which is tilted from the normal direction perpendicular to the substrate to one arbitrary orientation by 60° is two. Therefore, the proportion of a retroreflective area is higher than that in the dot shown in FIG. 4 when the optical member is observed after light irradiation from a direction which is oblique to a normal direction perpendicular to the optical member.

FIG. 7 is a schematic diagram showing a cross-section of an example of a dot having a Mexican hat shape which can be used in the optical member according to the present invention. In a cross-section of the dot 1 shown in FIG. 7 in a thickness direction, the surface shape 1A of the dot 1 opposite to the substrate 2 have three inflection points 12. As a result, the number of dot surfaces 11 perpendicular to a direction which is tilted from the normal direction perpendicular to the substrate to one arbitrary orientation by 60° is three. Therefore, the proportion of a retroreflective area is higher than that in the dot shown in FIG. 4 when the optical member is observed after light irradiation from a direction which is oblique to a normal direction perpendicular to the optical member.

<Configuration of Optical Member>

The optical member includes: a substrate; and a dot that is formed on a surface of the substrate.

The shape of the optical member is not particularly limited and is preferably, for example, a film shape, a sheet shape, or a plate shape. FIG. 1 is a schematic diagram showing a cross-section of an example of the optical member according to the present invention. In this example, the dots 1 are formed on an underlayer 4-side surface of the substrate 2 including a support 3 and an underlayer 4. Further, an overcoat layer 5 is provided on the dot-formed surface side of the substrate so as to cover the dots 1 and at least a portion of the dot-formed surface of the substrate 2.

<Optical Characteristics of Dot>

In the dot, the proportion of a retroreflective area is high when the optical member is observed after light irradiation from a direction which is oblique to a normal direction perpendicular to the dot.

The front surface reflectance of the dot may be low or higher. It is preferable that the front surface reflectance of the dot is high from the viewpoint of increasing retroreflection when the optical member is observed after light irradiation from a normal direction perpendicular to the optical member. The front surface reflectance of the dot is preferably 6% or higher, more preferably 30% or higher, still more preferably 35% or higher, and even still more preferably 40% or higher.

The optical member according to the present invention may be transparent or not in the visible range depending on the application and is preferably transparent. "Transparent" described in this specification represents that the non-polarized light transmittance (total transmittance) at a wavelength of 380 to 780 nm is preferably 50% or higher, more preferably 70% or higher, and still more preferably 85% or higher.

<Substrate>

The substrate included in the optical member according to the present invention functions as a substrate for forming the dot on the surface of the underlayer.

It is preferable that the reflectance of the substrate is low at a wavelength where the dot reflects light, and it is preferable that the substrate does not include a material which reflects light at a wavelength where the dot reflects light.

In addition, it is preferable that the substrate is transparent in the visible range. In addition, the substrate may be colored. However, it is preferable that the substrate is not colored or the area of the substrate colored is small. Further, the refractive index of the substrate is preferably about 1.2 to 2.0 and more preferably about 1.4 to 1.8. The above-described configurations are made in order to prevent deterioration in the visibility of an image displayed on a display in a case where the optical member is used for, for example, a front surface of the display.

The thickness of the substrate may be selected depending on the application without any particular limitation, and is preferably about 5 μm to 1000 μm, more preferably 10 μm to 250 μm, and still more preferably 15 μm to 150 μm.

The substrate may have a single-layer structure or a multi-layer structure. Examples of the substrate having a single-layer structure include glass, triacetyl cellulose (TAC), polyethylene terephthalate (PET), polycarbonate, polyvinyl chloride, acryl, and polyolefin. In a case where the substrate has a multi-layer structure, examples thereof a substrate including: one of the examples of the substrate having a single-layer structure that is provided as a support; and another layer that is provided on a surface of the support.

(Underlayer)

Examples of the other layer include an underlayer that is provided between the support and the dot. The underlayer is preferably a resin layer and more preferably a transparent resin layer. Examples of the underlayer include a layer for adjusting the surface shape during the formation of a dot, a layer for improving adhesion properties with a dot, and an alignment layer for adjusting the orientation of a polymerizable liquid crystal compound during the formation of a dot. It is preferable that the reflectance of the underlayer is low at a wavelength where the dot reflects light, and it is preferable that the underlayer does not include a material which reflects light at a wavelength where the dot reflects light. In addition, it is preferable that the underlayer is transparent. Further, the refractive index of the underlayer is preferably about 1.2 to 2.0 and more preferably about 1.4 to 1.8. It is preferable that the underlayer is a thermosetting resin or a photocurable resin obtained by curing a composition including a polymerizable compound which is directly applied to a surface of the support. Examples of the polymerizable compound include a non-liquid crystal compound such as a (meth)acrylate monomer or a urethane monomer.

The thickness of the underlayer is not particularly limited and is preferably 0.01 to 50 μm and more preferably 0.05 to 20 μm.

<Dot>

The optical member according to the present invention includes a dot that is formed on a surface of the substrate.

The dot has wavelength selective reflecting properties.

The dot has a cholesteric structure, and the cholesteric structure has a stripe pattern including bright portions and dark portions in a cross-sectional view of the dot when observed with a scanning electron microscope.

A surface shape of the dot opposite to the substrate in a cross-section of the dot in a thickness direction has at least one inflection point.

In the cross-section of the dot in the thickness direction, an angle between a normal line perpendicular to a line, which is formed using a first dark portion from a surface of the dot opposite to the substrate, and the surface of the dot is in a range of 70° to 90°.

The dot may be formed on a single surface or both surfaces of the substrate and is preferably formed on a single surface thereof.

One dot or two or more dots may be formed on the surface of the substrate. It is preferable that two or more dots are formed on the surface of the substrate. Two or more dots may be provided to be adjacent to each other on the surface of the substrate such that the total surface area of the dots is 50% or more, 60% or more, or 70% or more with respect to the area of the surface of the substrate where the dots are formed. For example, in this case, the optical characteristics of the dots such as wavelength selective reflecting properties may match with the optical characteristics of substantially the entire area of the optical member, in particular, the entire area of the surface where the dots are formed. On the other hand, two or more dots may be provided to be distant from each other on the surface of the substrate such that the total surface area of the dots is less than 50%, 30% or less, or 10% or less with respect to the area of the surface of the substrate where the dots are formed. For example, in this case, the optical characteristics of the surface of the optical member where the dots are formed may be recognized as a contrast between the optical characteristics of the substrate and the optical characteristics of the dots.

In the optical member according to the present invention, it is more preferable that a plurality of dots s are provided in a pattern shape on the surface of the substrate. A plurality of dots are formed in a pattern shape and may have a function of presenting information. For example, by forming the dots so as to provide position information on an optical member which is formed in a sheet shape, the optical member can be can be used as a sheet which can be mounted on a display and is capable of inputting data.

In a case where the dots are formed in a pattern shape, for example, a plurality of dots having a diameter of 20 to 200 μm are formed, 10 to 100 dots, preferably 15 to 80 dots, and more preferably 20 to 65 dots are provided on average in a square having a size of 2 mm×2 mm on the substrate surface.

In a case where a plurality of dots are provided on a surface of the substrate, the diameters and shapes of the dots may be the same as or different from each other and is preferably the same as each other. For example, it is preferable that the dots are formed under the same conditions for forming the dots having the same diameter and shape.

In this specification, the description of the dot is applicable to all the dots in the optical member according to the present invention. Further, it is allowable that the optical member according to the present invention including the above-described dots also includes a dot which deviates from the above description due to a error which is allowable in the technical field.

(Shape of Dot)

A surface shape of the dot opposite to the substrate in a cross-section of the dot in a thickness direction has at least one inflection point. The number of inflection points is obtained as follows. Regarding one dot positioned at the center of the optical member as in the case of the observation with a scanning electron microscope, a surface of the dot including the dot center is cut in a direction perpendicular to the substrate to obtain a cross-section. In this cross-section, a low pass filter is applied to a measured cross-section curve of the dot surface opposite to the substrate to obtain a cross-section curve, and a point at which the slope of the cross-section curve is 0 is set as an inflection point.

From the viewpoint of increasing the proportion of a retroreflective area in the dot when the optical member is observed after light irradiation from a direction which is oblique to a normal direction perpendicular to the optical member, the surface shape of the dot opposite to the substrate 2 in the cross-section of the dot in the thickness direction has preferably two or more inflection points, more preferably two to four inflection points, and still more preferably two or three inflection points.

The shape of the cross-section of the dot in the thickness direction is not particularly limited as long as the surface shape of the dot opposite to the substrate in the cross-section of the dot in the thickness direction has at least one inflection point. Examples of the shape of the cross-section of the dot in the thickness direction which can be used in the present invention include a coffee-stain shape, a doughnut shape, and a Mexican hat shape.

The coffee-stain shape refers to a shape in which a state called a coffee-stain phenomenon occurs. In a film forming step using a liquid material, in a case where the applied liquid material film is dried, a state called a coffee-stain phenomenon where the outer periphery of the film swells may occur. The reason for this is presumed to be as follows. In the process of drying the liquid material film, a solvent is not uniformly evaporated. Therefore, the concentration of a solute in the outer periphery portion increases, the viscosity increases, and the outer periphery portion gels. Gelling refers to a phenomenon in which the solute does not melt to some extent and does not move. The details of the coffee-stain phenomenon and a mechanism in which a coffee-stain shape is formed can be found in the drawings of JP2008-040119A, the content of which is incorporated herein by reference. In this specification, a doughnut shape is excluded from the coffee-stain shape.

The details of a method of forming a dot in a coffee-stain shape can be found in JP2014-171956A and JP2012-199330A, the contents of which are incorporated herein by reference.

The doughnut shape refers to a shape having a portion of a film other than an outer periphery where the dot height in a cross-section in a dot thickness direction is 0, the film being in a state where a coffee-stain phenomenon occurs.

The details of a method of forming a dot in a doughnut shape can be found in p. 609 to p. 616, BioTechniques, 41, 5, Nov. 2006, the content of which is incorporated herein by reference.

The Mexican hat shape refers to a shape in which an outer periphery of a film and a center portion of the film swell and which has a portion whose height does not continuously increases in a range between the outer periphery of the film and the center portion of the film in a direction from an end portion of the film to the center thereof. In the Mexican hat shape, it is preferable that the height of the center portion of the film is higher than that of the outer periphery of the film.

The details of a method of forming a dot in a Mexican hat shape can be found in Phys. Rev. E, 68, 052801 (2003), the content of which is incorporated herein by reference.

A shape of the dot when observed from the normal direction perpendicular to the substrate (orthogonal projection of the dot from the normal direction perpendicular to the substrate) is not particularly limited and is preferably a circular shape. The circular shape is not necessarily a perfect circle and may be a substantially circular shape. The center of the dot described herein refers to the center of the circle or the center of gravity. In a case where a plurality of dots are provided on a surface of the substrate, it is preferable that the average shape of the dots is circular, and some dots may have a shape other than a circular shape.

In the optical member according to the present invention, the maximum height of the dot (also referred to as "dot maximum height Hmax") is preferably less than 20 µm, more preferably 15 µm or less, and still more preferably 10 µm or less from the viewpoint of reducing the dot maximum height.

On the other hand, from the viewpoint of increasing the front surface reflectance of the dot, the dot maximum height Hmax is preferably 1 µm or more, 2 µm or more, and still more preferably 3 µm or more. In a case where the dot maximum height Hmax is 10 µm or more, the front surface reflectance of the dot can be increased. From the viewpoint of reducing the dot maximum height, the dot maximum height Hmax is more preferable 3 µm or more and less than 10 µm.

"The height" of the dot described in this specification refers to "the shortest distance from a point of a surface of the dot opposite to the substrate to a surface of the substrate where the dot is formed". At this time, the surface of the dot may be an interface with another layer. In addition, in a case where the substrate has convex and concave portions, a surface of an end portion of the dot extending from the substrate is set as the surface where the dot is formed. The maximum height refers to a maximum value of the height which is, for example, the shortest distance from the peak of the dot to the surface of the substrate where the dot is formed. The height of the dot can be obtained from a cross-sectional view of the dot which is obtained by focal position scanning using a laser microscope or obtained using a microscope such as a SEM or a TEM (transmission electron microscope).

Depending on the shape of the dot, "the maximum height of the dot" and "the height of the center of the dot in the cross-section of the dot in the thickness direction" may or may not match with each other. For example, in a case where the cross-section of the dot in the thickness direction has a coffee-stain shape or a doughnut shape among a coffee-stain shape, a doughnut shape, and a Mexican hat shape, "the maximum height of the dot" and "the height of the center of the dot in the cross-section of the dot in the thickness direction" (hereinafter, also referred to as "dot center height Hc") does not match with each other.

From the viewpoint of increasing the proportion of a retroreflective area when the optical member is observed after light irradiation from the oblique direction, it is preferable that the optical member according to the present invention satisfies the following Expression 1.

$$(Hc/Hmax) < 1 \qquad \text{Expression 1}$$

In Expression 1, Hmax represents the maximum height of the dot, Hc represents a height at a center of the dot in the cross-section of the dot in the thickness direction, and the center of the dot is the center of gravity of an orthogonal projection of the dot from the normal direction perpendicular to the substrate.

From the viewpoint of increasing the proportion of a retroreflective area when the optical member is observed after light irradiation from the oblique direction and the viewpoint of increasing the front surface reflectance of the dot, it is more preferable that the optical member according to the present invention satisfies the following Expression 2.

$$0.16 < (Hc/Hmax) < 1 \qquad \text{Expression 2}$$

In Expression 2, Hmax represents the maximum height of the dot, Hc represents a height at a center of the dot in the cross-section of the dot in the thickness direction, and the center of the dot is the center of gravity of an orthogonal projection of the dot from the normal direction perpendicular to the substrate.

From the viewpoint of increasing the front surface reflectance of the dot, it is preferable that the optical member according to the present invention satisfies the following Expression 3.

$$0.25 < (Hc/Hmax) < 1 \qquad \text{Expression 3}$$

In Expression 3, Hmax represents the maximum height of the dot, Hc represents a height at a center of the dot in the cross-section of the dot in the thickness direction, and the center of the dot is the center of gravity of an orthogonal projection of the dot from the normal direction perpendicular to the substrate.

In the optical member according to the present invention, the diameter of the dot is preferably 20 to 200 µm, more preferably 30 to 180 µm, and still more preferably 30 to 150 µm.

The diameter of the dot can be obtained by measuring the length of a line, which ranges from an end portion (an edge or a boundary of the dot) to another end portion and passes through the center of the dot, in an image obtained using a microscope such as a laser microscope, a scanning electron microscope (SEM), or a transmission electron microscope (TEM). The number of dots and the distance between dots can be obtained from a microscopic image obtained using a laser microscope, a scanning electron microscope (SEM), or a transmission electron microscope (TEM)

It is preferable that a value (maximum height/diameter) obtained by dividing the maximum height by the diameter of the dot is 0.10 to 0.30. In particular, in the coffee-stain shape, the doughnut shape, or the Mexican hat shape in a plan view of the substrate side, it is preferable that the above-described range is satisfied. In the dot, the value of maximum height/diameter is more preferably 0.11 to 0.28.

In the optical member according to the present invention, from the viewpoint of increasing the proportion of a retroreflective area when the optical member is observed after light irradiation from a direction which is oblique to a normal direction perpendicular to the optical member, the number of dot surfaces perpendicular to a direction which is tilted from the normal direction perpendicular to the substrate to one arbitrary orientation by 60° is preferably two or more, more preferably two to four, and still more preferably two or three.

Further, in a case where the number of dot surfaces perpendicular to a direction which is tilted from the normal direction perpendicular to the substrate to one arbitrary orientation by 60° is two or more, an actual dot position which is present between the two or more dot surfaces can be corrected using a device different from the optical member. Therefore, in a case where the number of dot surfaces perpendicular to a direction which is tilted from the normal direction perpendicular to the substrate to one arbitrary orientation by 60° is two or more as in, for example, the dot shown in FIGS. 5 to 7, as compared to a case where the number of dot surfaces 11 perpendicular to a direction which is tilted from the normal direction perpendicular to the substrate to one arbitrary orientation by 60° is one as in, for example, the dot having a dome shape shown in FIG. 4, a deviation in the visual recognition of an actual dot position can be easily corrected, and the positional accuracy of the dot can be increased when the optical member is observed after the oblique light irradiation.

In the optical member, from the viewpoint of increasing the proportion of a retroreflective area when the optical member is observed after light irradiation from a direction which is oblique to a normal direction perpendicular to the optical member, the number of dot surfaces perpendicular to a direction which is tilted from the normal direction perpendicular to the substrate to one arbitrary orientation by 45° is preferably two or more, more preferably two to four, and still more preferably two or three.

In the optical member, from the viewpoint of increasing the proportion of a retroreflective area when the optical member is observed after light irradiation from a direction which is oblique to a normal direction perpendicular to the optical member, the number of dot surfaces perpendicular to a direction which is tilted from the normal direction perpendicular to the substrate to one arbitrary orientation by 50° is preferably two or more, more preferably two to four, and still more preferably two or three.

As long as a surface shape of the dot opposite to the substrate in a cross-section of the dot in a thickness direction has at least one inflection point, it is preferable that the dot includes a portion having a height which continuously increases to a maximum height in a direction moving from an end portion of the dot to the center of the dot. That is, it is preferable that the dot includes an inclined portion, a curved portion, or the like whose height increases from an end portion of the dot to the center of the dot. In this specification, the above portion will also be referred to as the inclined portion or the curved portion. The inclined portion or the curved portion refers to a portion of a dot surface in a cross-sectional view, the portion being surrounded by a portion of the dot surface which ranges from a continuous increasing start point to a maximum height point, a straight line which connects the points to the substrate at the shortest distance, and the substrate.

The continuous inclined portion or the continuous curved portion may be present at end portions in some or all the directions when seen from the center of the dot, or may not be present at end portions in all the directions. For example, in a case where the cross-section of the dot in the thickness direction has a coffee-stain shape or a doughnut shape among a coffee-stain shape, a doughnut shape, and a Mexican hat shape, the continuous inclined portion or the continuous curved portion is present at end portions in some or all the directions when seen from the center of the dot. On the other hand, in a case where the cross-section of the dot in the thickness direction has a Mexican hat shape, the continuous inclined portion or the continuous curved portion is not present at end portions.

For example, in a case where an orthogonal projection of the dot from the normal direction perpendicular to the substrate is circular, end portions correspond to the circumference, and the inclined portion or the curved portion may be present at end portions in some directions of the circumference (for example, portions corresponding to a length of 30% or more, 50% or more, or 70% or more and 90% or less of the circumference), or may be present at end portions in all the directions of the circumference (90% or more, 95% or more, or 99% or more of the circumference). It is preferable that the end portions of the dot may be present in all the directions of the circumference.

It is preferable that changes in height from the center of the dot to the circumference are the same in all the directions of the circumference. In addition, it is preferable that optical characteristics such as retroreflection properties and the properties described regarding the cross-sectional view are the same in all the directions moving from the center to the circumference.

The inclined portion or the curved portion may be at a predetermined distance from an end portion of the dot (an edge or a boundary of the circumference) so as not to reach the center of the dot, or may reach the center of the dot from an end portion of the dot. In addition, the inclined portion or the curved portion may be at a predetermined distance from a portion, which is at a predetermined distance from an edge (boundary) of the circumference of the dot, so as not to reach the center of the dot, or may reach the center of the dot from a portion which is at a predetermined distance from an end portion of the circumference of the dot.

In addition, an angle (for example, an average value) between a surface of the dot opposite to the substrate and the substrate (surface of the substrate where the dot is formed) is preferably 27° to 62° and more preferably 29° to 60°. By setting the angle in the above-described range, the dot can be made to exhibit high retroreflection properties at a light incidence angle which is suitable for the applications of the optical member described below.

The angle can be obtained from a cross-sectional view of the dot which is obtained by focal position scanning using a laser microscope or obtained using a microscope such as a SEM or a TEM. In this specification, in a SEM image of a cross-sectional view of a surface of the dot perpendicular to the substrate including to the center of the dot, the angle of a contact portion between the substrate and the dot surface is measured.

(Optical Characteristics of Dot)

The dot has wavelength selective reflecting properties. Light where the dot exhibits wavelength selective reflecting properties is not particularly limited. For example, any one of infrared light, visible light, and ultraviolet light may be used. For example, in a case where the optical member is attached to a display device and is used for directly handwriting data on the display device to input data, the light to which the dot exhibits wavelength selective reflecting properties is preferably invisible light and more preferably infrared light in order not to adversely affect a display image. That is, in the optical member according to the present invention, it is preferable that the dot exhibits wavelength selective reflecting properties in which the reflection maximum wavelength is present in the infrared range. Light to which the dot exhibits wavelength selective reflecting properties is more preferably near infrared light. For example, it is preferable that a spectrum of reflection from the dot shows a reflection wavelength range in which a reflection maximum wavelength is present in a wavelength range of 750 to 2000 nm and preferably 800 to 1500 nm. It is also preferable that the reflection wavelength range in which the reflection maximum wavelength is present in the above-described range is selected based on a wavelength of light emitted from a light source which is used in combination or a wavelength of light which is detected by an image pickup element (sensor).

The dot has a cholesteric structure. In the optical member according to the present invention, a surface shape of the dot opposite to the substrate in a cross-section of the dot in a thickness direction has at least one inflection point, and a helical axis direction of the cholesteric structure included in the dot is controlled. Therefore, the retroreflection range to light incident from various directions is wide. Light which is obliquely incident on the substrate (for example, the laminate including the support and the underlayer) is not reflected by retroreflection. Therefore, the retroreflection range of the optical member is substantially the same as that of the dot.

In the optical member according to the present invention, it is preferable that the cholesteric structure of the dot includes a liquid crystal material having a cholesteric liquid crystal structure, and it is more preferable that the cholesteric structure of the dot includes a liquid crystal material having a cholesteric liquid crystal structure and that the liquid crystal material includes a surfactant. The wavelength of light where the dot exhibits wavelength selective reflecting properties can be adjusted by adjusting a helical pitch in the cholesteric structure of the liquid crystal material which forms the dot as described above.

The front surface reflectance of the dot may be low or higher. It is preferable that the front surface reflectance of the dot is high from the viewpoint of increasing the reflection intensity of retroreflection when the dot is observed after light irradiation from a normal direction perpendicular to the optical member.

It is preferable that the dot is transparent in the visible range. In addition, the dot may be colored. However, it is preferable that the dot is not colored or the area of the dot colored is small. The above-described configurations are made in order to prevent deterioration in the visibility of an image displayed on a display in a case where the optical member is used for, for example, a front surface of the display.

(Cholesteric Structure)

It is known that the cholesteric structure exhibits wavelength selective reflecting properties at a specific wavelength. A reflection maximum wavelength λ of the selective reflection depends on a pitch P (=helical cycle) of a helical structure in the cholesteric structure and complies with an average refractive index n of a cholesteric liquid crystal and a relationship of λ=n×P. Therefore, the reflection maximum wavelength can be adjusted by adjusting the pitch of the helical structure. The pitch of the cholesteric structure depends on the kind of a chiral agent which is used in combination of a polymerizable liquid crystal compound during the formation of the dot, or the concentration of the chiral agent added. Therefore, a desired pitch can be obtained by adjusting the kind and concentration of the chiral agent. The details of the preparation of the pitch can be found in "Fuji Film Research&Development" No. 50 (2005), pp. 60 to 63. As a method of measuring a helical sense or pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

In the optical member according to the present invention, the cholesteric structure has a stripe pattern including bright portions and dark portions in a cross-sectional view of the dot when observed with a scanning electron microscope (SEM). Two cycles of the bright portion and the dark portion (two bright portions and two dark portions) correspond to one helical pitch. Based on the above fact, the pitch can be measured from the SEM cross-sectional view. A normal line perpendicular to each line of the stripe pattern is a helical axis direction.

Reflected light of the cholesteric structure is circularly polarized light. That is, reflected light of the dot in the optical member according to the present invention is circularly polarized light. The application of the optical member according to the present invention can be selected in consideration of the circularly polarized light selective reflecting properties. Whether or not the reflected light of the cholesteric structure is right circularly polarized light or left circularly polarized light is determined based on a helical twisting direction. Regarding the selective reflection using the cholesteric liquid crystals, in a case where the helical twisting direction of the cholesteric liquid crystals is right, right circularly polarized light is reflected, and in a case where the helical twisting direction of the cholesteric liquid crystals is left, left circularly polarized light is reflected.

In addition, a full width at half maximum Δλ (nm) of a selective reflection range (circularly polarized light reflection range) depends on a birefringence Δn of the liquid crystal compound and the pitch P and complies with a relationship of Δλ=Δn×P. Therefore, the selective reflection range can be controlled by adjusting Δn. Δn can be adjusted by adjusting the kind of the polymerizable liquid crystal compound and a mixing ratio thereof, or by controlling a temperature during oriented immobilization. The full width at half maximum of the reflection wavelength range is adjusted depending on the application of the optical member according to the present invention and is, for example, 50 to 500 nm and preferably 100 to 300 nm.

(Cholesteric Structure of Dot)

In a case where the inclined portion or the curved portion in the cholesteric structure of the dot is observed in a cross-sectional view using a scanning electron microscope (SEM), an angle between a normal line perpendicular to a line, which is formed using a first dark portion from a surface of the dot opposite to the substrate, and the surface is in a range of 70° to 90°. At this time, regarding all the points of the inclined portion or the curved portion, an angle between a normal direction perpendicular to a line, which is formed using a first dark portion from a surface of the dot opposite to the substrate, and the surface may be in a range of 70° to 90°. That is, the angle only has to satisfy the above-described range at some points of the inclined portion or the curved portion. For example, the angle only has to satisfy the above-described range not intermittently but continuously at some points of the inclined portion or the curved portion. In this case, the cross-sectional shape of the dot in the thickness direction may have a portion other than the inclined portion or the curved portion as in the case of, for example, a Mexican hat shape. In a case where the surface in the cross-sectional view is curved, an angle between the normal line and the curved surface refers to an angle between the normal line and a tangent line from the surface. In addition, the angle between the normal line and the surface is expressed by an acute angle and is in a range of 70° to 110° when expressed by an angle of 0° to 180°. In the cross-sectional view, it is preferable that an angle between a normal line perpendicular to each of lines, which are formed using first and second dark portions from a surface of the dot opposite to the substrate, and the surface is in a range of 70° to 90°, it is more preferable that an angle between a normal line perpendicular to each of lines, which are formed using first to third or fourth dark portions from a surface of the dot opposite to the substrate, and the surface is in a range of 70° to 90°, and it is still more preferable that an angle between a normal line perpendicular to each of lines, which are formed using first to fifth to twelfth or more dark portions from a surface of the dot opposite to the substrate, and the surface is in a range of 70° to 90°.

The angle is preferably in a range of 80° to 90° and more preferably in a range of 85° to 90°.

The cross-sectional view obtained using the SEM shows that a helical axis of the cholesteric structure forms an angle of 70° to 90° with a surface of the dot of the inclined portion or the curved portion. Due to the above-described structure, light incident on the dot in a direction with an angle from a normal direction perpendicular to the substrate can be made to be incident at an angle, which is substantially parallel to the helical axis direction of the cholesteric structure, at the inclined portion or the curved portion. Therefore, the dot can exhibit high retroreflection properties with respect to light incident from various directions with an angle from the normal direction perpendicular to the substrate. For example, depending on the shape of the dot, the dot can exhibit high retroreflection properties with respect to light incident from a direction with an angle (in this specification, also referred to as "polar angle") of 60° to 0° from the normal line perpendicular to the substrate. It is more preferable that the dot can exhibit high retroreflection properties with respect to light incident from a direction with a polar angle of 45° to 0°.

It is preferable that, by making a helical axis of the cholesteric structure to form an angle of 70° to 90° with a surface of the dot of the inclined portion or the curved portion, an angle between a normal direction perpendicular to a line, which is formed using a first dark portion from the surface, and a normal direction perpendicular to the substrate continuously decreases along with a continuous increase in the height.

The cross-sectional view is a cross-sectional view of a surface in an arbitrary direction including a portion having a height which continuously increases to a maximum height in a direction moving from an end portion of the dot to the center of the dot. Typically, the cross-sectional view may be a cross-sectional view of an arbitrary surface which includes the center of the dot and is perpendicular to the substrate.

(Method of Forming Cholesteric Structure)

A step of disposing a dot having wavelength selective reflecting properties on a surface of a substrate is not particularly limited as long as a dot which can be used in the optical member according to the present invention can be formed.

As described above, the dot which can be used in the optical member according to the present invention has a cholesteric structure. The cholesteric structure can be obtained by immobilizing a cholesteric liquid crystal phase. The structure in which a cholesteric liquid crystal phase is immobilized may be a structure in which the orientation of the liquid crystal compound as a cholesteric liquid crystal phase is immobilized. Typically, the structure in which a cholesteric liquid crystal phase is immobilized may be a structure which is obtained by making the polymerizable liquid crystal compound to be in a state where a cholesteric liquid crystal phase is oriented, polymerizing and curing the polymerizable liquid crystal compound with ultraviolet irradiation, heating, or the like to form a layer having no fluidity, and concurrently changing the state of the polymerizable liquid crystal compound into a state where the oriented state is not changed by an external field or an external force. The structure in which a cholesteric liquid crystal phase is immobilized is not particularly limited as long as the optical characteristics of the cholesteric liquid crystal phase are maintained, and the liquid crystal compound does not necessarily exhibit liquid crystallinity. For example, the molecular weight of the polymerizable liquid crystal compound may be increased by a curing reaction such that the liquid crystallinity thereof is lost.

Examples of a material used for forming the cholesteric structure include a liquid crystal material obtained by curing a composition which includes a material capable of forming a cholesteric structure (for example, preferably a liquid crystal composition which includes a liquid crystal compound). It is preferable that the liquid crystal compound is a polymerizable liquid crystal compound.

In the optical member according to the present invention, it is preferable that the dot is formed of a liquid crystal material having a cholesteric structure and that the liquid crystal material includes a surfactant. That is, it is preferable that the liquid crystal composition including a polymerizable liquid crystal compound further includes a surfactant. The surfactant is more preferably a fluorine-containing compound, and still more preferably a fluorine-containing polymer compound from the viewpoint of easily forming a dot in which a surface shape of the dot opposite to the substrate in a cross-section of the dot in a thickness direction has at least one inflection point.

In the optical member according to the present invention, it is preferable that the liquid crystal material is a material obtained by curing a liquid crystal composition including a liquid crystal compound, a chiral agent, and the surfactant.

The liquid crystal composition may further include a polymerization initiator.

—Polymerizable Liquid Crystal Compound—

The polymerizable liquid crystal compound may be a rod-shaped liquid crystal compound or a disk-shaped liquid crystal compound and is preferably a rod-shaped liquid crystal compound.

Examples of the rod-shaped polymerizable liquid crystal compound for forming the cholesteric liquid crystal phase include a rod-shaped nematic liquid crystal compound. As the rod-shaped nematic liquid crystal compound, an azomethine compound, an azoxy compound, a cyanophenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3. Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770, 107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the orientation temperature can be decreased.

Specific examples of the polymerizable liquid crystal compound include a compound represented by any one of the following formulae (1) to (11).

[In Compound (11), $X^1$ represents 2 to 5 (integer).]

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A),

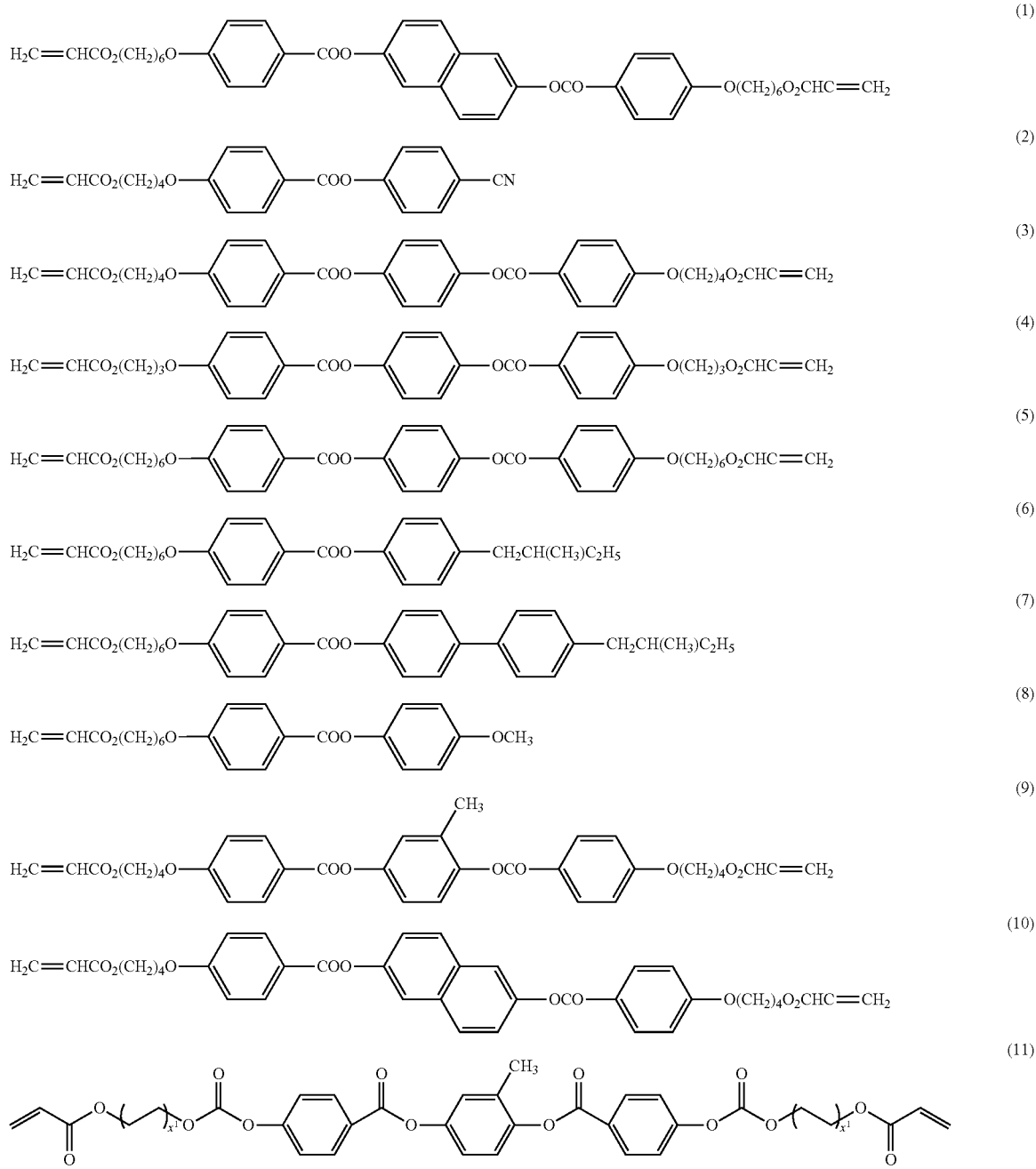

and a liquid crystal polymer described in JP1999-293252A (JP-H11-293252A) can be used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

It is preferable that the surfactant is added to the composition (preferably a liquid crystal composition), which is used for forming a dot and includes a material capable of forming a cholesteric structure, from the viewpoint of obtaining a dot in which the polymerizable liquid crystal compound is oriented to be parallel to an air interface side during the formation of the dot and in which the helical axis direction can be controlled as described above. In general, for the formation of a dot, it is necessary that the surface tension is not decreased to maintain a liquid drop shape during printing. Therefore, it is surprising that a dot can be formed even after the addition of the surfactant and that the dot exhibits high retroreflection properties in multiple directions. Examples described below shows that, in the optical member according to the present invention in which the surfactant was used, an angle between a dot surface and the substrate at a dot end portion was 27° to 62°. That is, it can be seen that, in the optical member according to the present invention, at dot shape can be obtained in which high retroreflection properties at an incidence angle of light required for use in an input medium, which is used in combination with input means such as an electronic pen, are exhibited. It is preferable that the surfactant is a compound which can function as an orientation controller contributing to the stable or rapid formation of a cholesteric structure with planar orientation. Examples of the surfactant include a silicone surfactant and a surfactant as a fluorine-containing compound (also referred to as a fluorine surfactant). Among these, the surfactant as a fluorine-containing compound is preferable.

Specific examples of the surfactant which can be used for the dot include compounds described in JP2014-119605A, compounds described in JP2012-203237A, exemplary compounds described in JP2005-99248A, exemplary compounds described in JP2002-129162A, MEGAFACE RS-90 (manufactured by DIC Corporation) which is a surfactant as a fluorine-containing compound, fluorine (meth)acrylate polymers described in JP2007-272185A, and surfactants described in JP2008-257205A which describes a surfactant as a fluorine-containing polymer compound shown below.

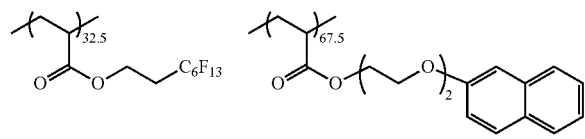

The contents of the above-described citations are incorporated herein by reference. In the optical member according to the present invention, a surfactant as a fluorine-containing polymer compound is more preferable.

As the surfactant, one kind may be used alone, or two or more kinds may be used in combination.

As the surfactant as a fluorine-containing compound a compound represented by Formula (1) described in JP2014-119605A can also be used as long as a dot in which a surface shape of the dot opposite to the substrate in a cross-section of the dot in a thickness direction has at least one inflection point can be formed.

The addition amount of the surfactant in the composition (preferably a liquid crystal composition) which includes a material capable of forming a cholesteric structure relates to the cross-sectional shape of the dot in the thickness direction. The addition amount of the surfactant with respect to the total mass of the polymerizable liquid crystal compound is preferably 0.01 mass % to 10 mass %, more preferably 0.01 mass % to 5 mass %, and still more preferably 0.05 mass % to 3 mass % from the viewpoint of easily forming a dot in which a surface shape of the dot opposite to the substrate in a cross-section of the dot in a thickness direction has at least one inflection point. However, in a case where the addition amount of the surfactant is outside of the above-described range, a dot in which a surface shape of the dot opposite to the substrate in a cross-section of the dot in a thickness direction has at least one inflection point can be formed. For example, a dot having a Mexican hat shape can be formed.

—Chiral Agent (Optically Active Compound)—

It is preferable that the composition (preferably a liquid crystal composition) which includes a material capable of forming a cholesteric structure includes a chiral agent. The chiral agent has a function of causing a helical structure of a cholesteric liquid crystal phase to be formed. The chiral compound may be selected depending on the purpose because a helical twisting direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for TN or STN, p. 199), isosorbide, or an isomannide derivative can be used. TN is an abbreviation for twisted nematic. STN is an abbreviation for super-twisted nematic.

In general, the chiral agent includes an asymmetric carbon atom. However, an axially asymmetric compound or a surface asymmetric compound not having an asymmetric carbon atom can be used. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this configuration, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection maximum wavelength corresponding to an emission wavelength can be formed by photomask exposure of an actinic ray or the like after coating and orientation, which is preferable. As the photoisomerization group, an isomerization portion of a photochromic compound, azo, azoxy, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

Specific examples of the chiral agent include a compound represented by the following Formula (12).

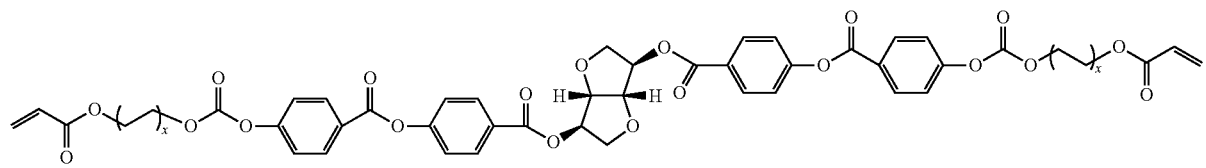

(12)

In the formula, X represents 2 to 5 (integer).

The content of the chiral agent in the composition (preferably a liquid crystal composition) which includes a material capable of forming a cholesteric structure is preferably 0.01 mol % to 200 mol % and more preferably 1 mol % to 30 mol % with respect to the amount of the polymerizable liquid crystal compound.

—Polymerization Initiator—

In a case where the composition (preferably a liquid crystal composition) which includes a material capable of forming a cholesteric structure includes a polymerizable compound, it is preferable that the composition includes a polymerization initiator. In a configuration where a polymerization reaction progresses with ultraviolet irradiation, it is preferable that the polymerization initiator is a photopolymerization initiator which initiates a polymerization reaction with ultraviolet irradiation. Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the composition (preferably a liquid crystal composition) which includes a material capable of forming a cholesteric structure is preferably 0.1 to 20 mass % and more preferably 0.5 mass % to 12 mass % with respect to the content of the polymerizable liquid crystal compound.

—Crosslinking Agent—

From the viewpoint of improving the film hardness after curing and improving the durability, the composition (preferably a liquid crystal composition) which includes a material capable of forming a cholesteric structure may include an arbitrary crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3 mass % to 20 mass % and more preferably 5 mass % to 15 mass %. In a case where the content of the crosslinking agent is lower than 3 mass %, an effect of improving the crosslinking density may not be obtained. In a case where the content of the crosslinking agent is higher than 20 mass %, the stability of a cholesteric structure may deteriorate.

—Other Additives—

In a case where an ink jet method described below is used as a method of forming the dot, a monofunctional polymerizable monomer may be used in order to obtain generally required ink properties. Examples of the monofunctional polymerizable monomer include 2-methoxyethyl acrylate, isobutyl acrylate, isooctyl acrylate, isodecyl acrylate, and octyl/decyl acrylate.

In addition, optionally, a polymerization inhibitor, an antioxidant, an ultraviolet absorber, a light stabilizer, a colorant, metal oxide particles or the like can be added to the composition (preferably a liquid crystal composition) which includes a material capable of forming a cholesteric structure in a range where optical performance and the like do not deteriorate.

—Solvent—

It is preferable that the composition (preferably a liquid crystal composition) which includes a material capable of forming a cholesteric structure is formed as liquid during the formation of the dot.

The composition (preferably a liquid crystal composition) which includes a material capable of forming a cholesteric structure may include a solvent. The solvent is not particularly limited and can be appropriately selected depending on the purpose. An organic solvent is preferably used.

The organic solvent is not particularly limited and can be appropriately selected depending on the purpose. Examples of the organic solvent include a ketone such as methyl ethyl ketone, methyl isobutyl ketone, cyclopentanone, or cyclohexanone, an alkyl halide, an amide, a sulfoxide, a heterocyclic compound, a hydrocarbon, an ester, and an ether such as anisole. Among these organic solvents, one kind may be used alone, or two or more kinds may be used in combination. From the viewpoints of satisfying conditions described in JP2008-040119A and easily forming a dot in which a surface shape of the dot opposite to the substrate in a cross-section of the dot in a thickness direction has at least one inflection point, the boiling point of the solvent is preferably 60° C. to 180° C., more preferably 70° C. to 170° C., and still more preferably 70° C. to 160° C. Among these, a ketone is more preferable in consideration of an environmental burden. The above-described component such as the above-described monofunctional polymerizable monomer may function as the solvent.

—Application and Jetting—

It is preferable that the step of disposing a dot having wavelength selective reflecting properties on a surface of a substrate is a step of applying (preferably jetting) the composition (preferably a liquid crystal composition) which includes a material capable of forming a cholesteric structure to a surface of a substrate. It is preferable that the material capable of forming a cholesteric structure is applied to the substrate and cured to form a dot.

The material capable of forming a cholesteric structure can be applied to the substrate, for example, by coating or jetting, and preferably by jetting. In a case where a plurality of dots are formed on the substrate, the material capable of forming a cholesteric structure may be printed as an ink. A printing method is not particularly limited and, for example, an ink jet method, a gravure printing method, or a flexographic printing method can be used. Among these, an ink jet method is preferable. The pattern of the dots can also be formed using a well-known printing technique.

In a first aspect of a method of manufacturing an optical member according to the present invention described below, the temperature of the substrate (preferably a stage temperature) is set to be 40° C. or higher such that a dot in which a surface shape of the dot opposite to the substrate in a cross-section of the dot in a thickness direction has at least one inflection point can be formed. In the first aspect of the method of manufacturing an optical member according to the present invention described below, the stage temperature during the application of the material capable of forming a cholesteric structure to the substrate is 40° C. or higher, preferably 40° C. to 160° C., more preferably 40° C. to 140° C., and still more preferably 40° C. to 130° C.

In a second aspect of the method of manufacturing an optical member according to the present invention described below, the stage temperature during the application of the material capable of forming a cholesteric structure to the substrate is preferably 0° C. to 160° C. and more preferably 20° C. to 140° C. from the viewpoint of easily forming a dot in which a surface shape of the dot opposite to the substrate in a cross-section of the dot in a thickness direction has at least one inflection point. The stage temperature is still more preferably 40° C. to 130° C. from the viewpoint of simultaneously achieving high heat resistance of the substrate and the formation of the dot having the above-described shape. The stage refers to a stand for fixing the substrate in an image such as an ink jet printer.

In a case where the material capable of forming a cholesteric structure is jetted to the substrate to form a dot, the number of droplets of the material capable of forming a cholesteric structure jetted to form one dot (hereinafter, also referred to as "dot jetting number") is preferably less than 60, more preferably 1 to 45, and still more preferably 1 to 30 from the viewpoint of reducing the dot maximum height and the viewpoint of easily forming a dot in which a surface shape of the dot opposite to the substrate in a cross-section of the dot in a thickness direction has at least one inflection point. In a case where the material capable of forming a cholesteric structure is jetted to the substrate to form a dot, the amount of one droplet is 1 to 80 pl (picoliter) and more preferably 5 to 30 pl.

—Drying, Heating, and Curing—

After applied to the substrate, the composition (preferably a liquid crystal composition) which includes a material capable of forming a cholesteric structure is optionally dried or heated and then cured. In a drying or heating step, the polymerizable liquid crystal compound in the composition (preferably a liquid crystal composition) which includes a material capable of forming a cholesteric structure may be oriented. In the case of heating, the heating temperature is preferably 200° C. or lower and more preferably 130° C. or lower.

After the orientation, the composition (preferably a liquid crystal composition) which includes a material capable of forming a cholesteric structure may be polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 100 mJ/cm$^2$ to 1500 mJ/cm$^2$. In order to promote a photopolymerization reaction, light irradiation may be performed under heating conditions or in a nitrogen atmosphere. The wavelength of irradiated ultraviolet light is preferably 250 nm to 430 nm. From the viewpoint of stability, the polymerization degree is preferably high, and is preferably 70% or higher and more preferably 80% or higher.

The polymerization degree can be determined by obtaining a consumption ratio between polymerizable functional groups using an infrared (IR) absorption spectrum.

<Overcoat Layer>

The optical member may include an overcoat layer. The overcoat layer may be provided on the surface of the substrate where the dot is formed, and it is preferable that the surface of the optical member is smoothened.

The overcoat layer is not particularly limited and is preferably a resin layer having a refractive index of about 1.4 to 1.8. The refractive index of the dot formed of the liquid crystal material is about 1.6. By using an overcoat layer having a refractive index close to 1.6, the angle (polar angle) from the normal line of light which is actually incident on the dot can be reduced. For example, in a case where the overcoat layer having a refractive index of 1.6 is used and light is incident on the optical member at a polar angle of 45°, a polar angle at which light is reliably incident on the dot can be made to be about 27°. Therefore, by using the overcoat layer, the polar angle of light at which the optical member exhibits retroreflection properties can be widened, and high retroreflection properties can be obtained at a wider angle even in the dot in which an angle between a surface, which is opposite to the substrate, and the substrate is small. In addition, the overcoat layer may function as an antireflection layer, a pressure sensitive adhesive layer, an adhesive layer, or a hard coat layer.

Examples of the overcoat layer include a resin layer which is obtained by applying a composition including a monomer to the surface of the substrate where the dot is formed, and curing the coating film. The resin is not particularly limited and may be selected in consideration of, for example, adhesiveness with the substrate or the liquid crystal material for forming the dot. For example, a thermoplastic resin, a thermosetting resin, or an ultraviolet curable resin can be used. From the viewpoints of durability, solvent resistance, and the like, a resin which is curable by crosslinking is preferable, and an ultraviolet curable resin which is curable within a short period of time is more preferable. Examples of the monomer which can be used for forming the overcoat layer include ethyl (meth)acrylate, ethylhexyl (meth)acrylate, styrene, methylstyrene, N-vinylpyrrolidone, polymethylol propane tri(meth)acrylate, hexanediol (meth) acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

The thickness of the overcoat layer may be selected depending on the maximum height of the dot without any particular limitation, and is preferably about 5 µm to 100 µm, more preferably 10 µm to 50 µm, and still more preferably 20 µm to 40 µm. The thickness is the distance from a surface of the substrate, where the dot is formed, to a surface of the overcoat layer provided on a surface of the substrate, where the dot is not formed, which is opposite to the surface where the dot is formed.

<Application of Optical Member>

The application of the optical member according to the present invention is not particularly limited and can be used as various kinds of reflection members.

In particular, regarding the optical member where the dots are provided in a pattern shape, for example, by forming the pattern as a dot pattern which is encoded to present position information, the optical member can be used as an input medium which is used in combination with input means such as an electronic pen for converting handwritten information into digital data and inputting the digital data into an information processing device. The optical member is used after preparing the liquid crystal material for forming the dot such that the wavelength of light irradiated from the input means is the same as that where the dot exhibits reflecting properties. Specifically, the helical pitch of the cholesteric structure may be adjusted using the above-described method.

The optical member according to the present invention can also be used as an input medium such as an input sheet on a display screen such as a liquid crystal display. At this time, it is preferable that the optical member is transparent. The optical member may be attached to a display screen directly or with another film interposed therebetween so as to be integrated with a display, or may be detachably mounted on a display screen. At this time, it is preferable that the wavelength range of light where the dot in the optical member according to the present invention exhibits wavelength selective reflecting properties is different from that of light emitted from a display. That is, it is preferable that the dot has wavelength selective reflecting properties in the invisible range and that the display emits invisible light such that a detecting device does not detect light erroneously.

The details of a handwriting input system for converting handwritten information into digital data and inputting the digital data into an information processing device can be found in, for example, JP2014-67398A, JP2014-98943A, JP2008-165385A, JP2008-108236A, or JP2008-077451A.

Examples of a preferable embodiment of the case where the optical member according to the present invention is used as the sheet which is mounted on or in front of a surface of an image-displayable device include an embodiment described in JP4725417B.

Figure 3:
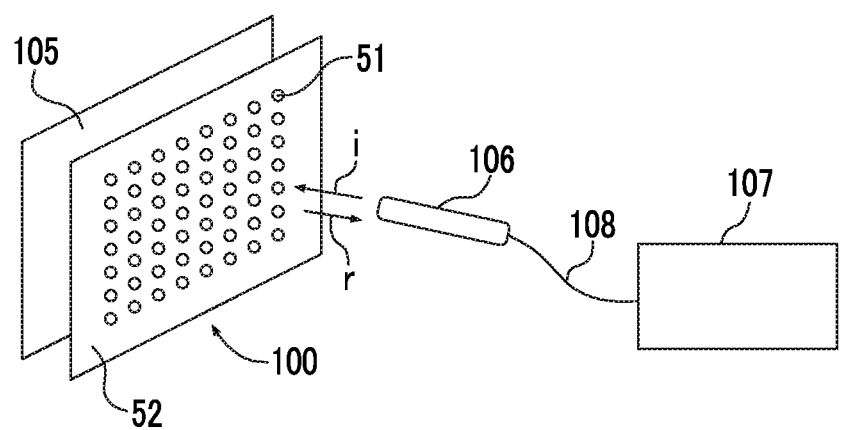
FIG. 3 is a schematic diagram showing a system in which the optical member according to the present invention is used as a sheet which is mounted on or in front of a surface of an image display device (image-displayable device).

FIG. 3 is a schematic diagram showing a system in which the optical member according to the present invention is used as a sheet which is mounted on or in front of a surface of an image-displayable device.

In FIG. 3, a well-known sensor may be used without any particular limitation as long as it emits infrared light i and can detect reflected light r from the above-described pattern. Examples of a pen type input terminal 106 including a read data processing device 107 include an input terminal described in JP2003-256137A including: a pen point that does not include an ink, graphite, or the like; a complementary metal-oxide semiconductor (CMOS) camera that includes an infrared irradiating portion; a processor, a memory; a communication interface such as a wireless transceiver using a Bluetooth (registered trade name) technique; and a battery.

Regarding the operation of the pen type input terminal 106, for example, the pen point is drawn in contact with a front surface of the optical member 100 according to the present invention, the pen type input terminal 106 detects a writing pressure applied to the pen point, and the CMOS camera operates such that a predetermined range around the pen point is irradiated with infrared light at a predetermined wavelength which is emitted from the infrared irradiating portion and such that the pattern is imaged (for example, the pattern is imaged several ten times to one hundred times per second). In a case where the pen type input terminal 106 includes the read data processing device 107, the imaged pattern is analyzed by the processor such that an input trajectory generated by the movement of the pen point during handwriting is converted into numerical values and data to generate input trajectory data, and the input trajectory is transmitted to an information processing device.

Members such as the processor, the memory, the communication interface such as a wireless transceiver using a Bluetooth (registered trade name) technique, or the battery may be provided outside of the pen type input terminal 106 as the read data processing device 107 as shown in FIG. 3. In this case, the pen type input terminal 106 may be connected to the read data processing device 107 through a cord 108, or may transmit read data wirelessly using an electric wave, infrared light, or the like.

In addition, the input terminal 106 may be a reader described in JP2001-243006A.

The read data processing device 107 which can be used in the present invention is not particularly limited as long as it has a function of calculating position information based on continuous image data read from the input terminal 106 and providing the calculated position information together with time information as generate input trajectory data which can be processed in an information processing device. The read data processing device 107 only has to include the members such as the processor, the memory, the communication interface, and the battery.

In addition, the read data processing device 107 may be embedded in the input terminal 106 as described in JP2003-256137A, or may be embedded in an information processing device including a display device. In addition, the read data processing device 107 may transmit the position information to an information processing device including a display device wirelessly, or may be connected thereto through a cord or the like.

In the information processing device connected to a display device 105, an image displayed on the display device 105 is sequentially updated based on trajectory information transmitted from the read data processing device 107 such that a trajectory which is handwritten by the input terminal 106 is displayed on the display device as if it was drawn on paper by a pen.

[Image Display Device]

An image display device according to the present invention includes the optical member according to the present invention.

It is preferable that the optical member according to the present invention is mounted on or in front of an image display surface of the image display device. For example, in the image display device, the optical member according to the present invention may be disposed between an outermost surface or a front surface protective plate of a display device and a display panel. A preferable embodiment of the image display device can be found in the above description regarding the application of the optical member.

The invention described in this specification also includes a system including the image display device in which the optical member according to the present invention is mounted on or in front of an image display surface.

[Method of Manufacturing Optical Member]

The first aspect of the method of manufacturing an optical member according to the present invention includes a step of disposing a dot having wavelength selective reflecting properties on a surface of a substrate, in which the substrate is heated to a temperature of 40° C. or higher.

The second aspect of the method of manufacturing an optical member according to the present invention includes a step of disposing a dot having wavelength selective reflecting properties on a surface of a substrate, in which the optical member according to the present invention is manufactured. By increasing the temperature of the substrate (stage temperature) to increase the drying rate, a dot having a stain shape or the like in which a surface shape of the dot opposite to the substrate in a cross-section of the dot in a thickness direction has at least one inflection point can be easily formed.

The details of the step of disposing a dot having wavelength selective reflecting properties on a surface of a substrate are described above in <Dot> of the optical member. In the first aspect of the method of manufacturing an optical member according to the present invention, for example, it is preferable that the step of disposing a dot having wavelength selective reflecting properties on a surface of a substrate is a step of applying the composition which includes a liquid crystal material capable of forming a cholesteric structure to a surface of a substrate and that the liquid crystal material includes a surfactant as a fluorine-containing polymer compound. Since the composition which includes a liquid crystal material capable of forming a cholesteric structure includes a polymer compound such as a fluorine-containing polymer compound, an outer periphery portion of a liquid material film is likely to gel (the details can be found in p. 49 to 63, "Applications & Materials of Inkjet Printer II" (Edited by Kyousuke TAKAHASHI, CMC Publishing Co., Ltd.)), and a dot in which a surface shape of the dot opposite to the substrate in a cross-section of the dot in a thickness direction has at least one inflection point can be formed. In the first aspect of the method of manufacturing an optical member according to the present invention, for example, it is preferable that the step of disposing a dot having wavelength selective reflecting properties on a surface of a substrate is a step of applying the composition which includes a liquid crystal material capable of forming a cholesteric structure to a surface of a substrate and that the liquid crystal material includes an ether solvent. In the first aspect of the method of manufacturing an optical member according to the present invention, the drying rate or drying timing of the solvent may be adjusted. In addition, in the first aspect of the method of manufacturing an optical member according to the present invention, a combination of the above-described methods may be adopted.

EXAMPLES

Hereinafter, the present invention will be described in detail using examples. Materials, reagents, amounts thereof, proportions thereof, operations, and the like shown in the following examples can be appropriately changed as long as they do not depart from the scope of the present invention. Accordingly, the scope of the present invention is not limited to the following examples.

Example 1

<Preparation of Underlayer>

A composition shown below was stirred and dissolved in a container held at 25° C. to prepare an underlayer-forming solution.

Underlayer-Forming Solution (Part(s) by Mass)
  Propylene glycol monomethyl ether acetate: 67.8
  Dipentaerythritol hexaacrylate (trade name: KAYARAD DPHA, manufactured by Nippon Kayaku Co., Ltd.): 5.0
  MEGAFACE RS-90 (manufactured by DIC Corporation): 26.7
  IRGACURE 819 (manufactured by BASF SE): 0.5

The underlayer-forming solution prepared as described above was applied to a transparent polyethylene terephthalate (PET; COSMOSHINE A4100, manufactured by Toyobo Co., Ltd.) substrate having a thickness of 100 μm using a bar coater in an application amount of 3 mL/m². Next, the underlayer-forming solution was heated such that the film surface temperature was 90° C., and then was dried for 120 seconds. Next, in a nitrogen purged atmosphere having an oxygen concentration of 100 mass parts per million (ppm) or lower, 700 mJ/cm² of ultraviolet light was irradiated using an ultraviolet irradiation device to promote a crosslinking reaction. As a result, an underlayer was prepared.

<Formation of Dot having Cholesteric Structure>

A composition shown below was stirred and dissolved in a container held at 25° C. to prepare a cholesteric liquid crystal ink solution (liquid crystal composition used as a liquid crystal material).

Cholesteric Liquid Crystal Ink Solution (Part(s) by Mass)
  Anisole: 145.0
  Mixture 1 of rod-shaped liquid crystal compounds having the following structures: 100.0
  IRGACURE 819 (manufactured by BASF SE): 10.0
  Chiral agent 1 having the following structure: 3.8
  Surfactant as a fluorine-containing polymer compound having the following structure: 0.8
  Mixture 1 of Rod-Shaped Liquid Crystal Compounds

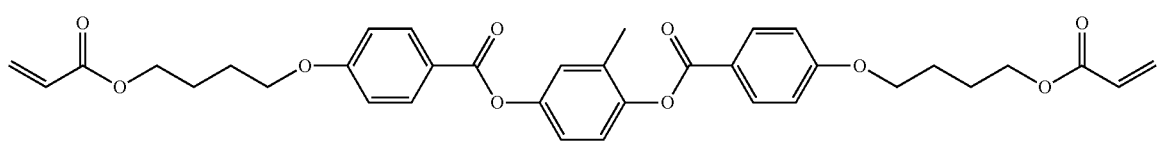

84%

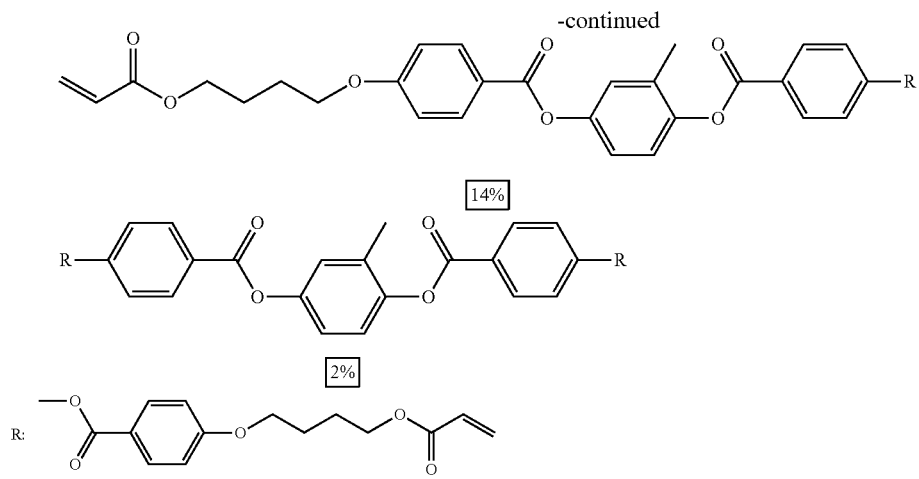

Numerical values are represented by mass %.
In addition, R represents a group bonded to an oxygen atom.

Chiral Agent 1

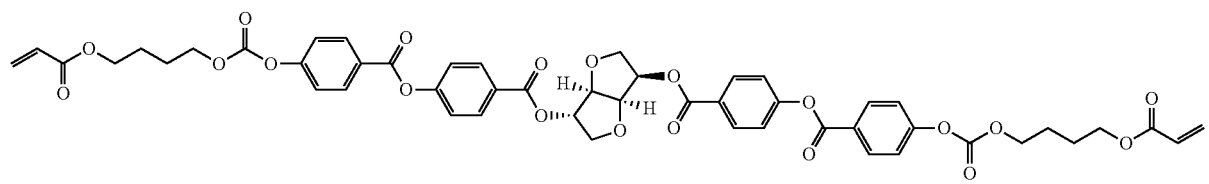 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Surfactant as Fluorine-Containing Polymer Compound

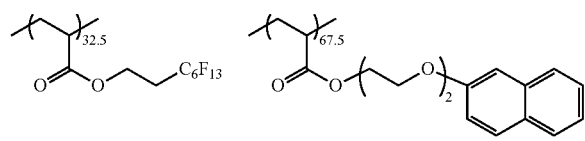

The cholesteric liquid crystal ink solution prepared as described above was applied to the entire 50×50 mm region of the underlayer of the PET substrate prepared as described above using an ink jet printer (DMP-2831, manufactured by Fujifilm Dimatix Inc.) such that the stage temperature was 40° C., the dot jetting number was 1, the distance between dot centers was 300 μm, and the dot diameter was 50 μm. Next, the applied cholesteric liquid crystal ink solution was dried at 95° C. for 30 seconds. Next, by irradiation of 500 mJ/cm$^2$ of ultraviolet light using an ultraviolet irradiation device, an optical member in which a plurality of dots having a cholesteric structure were formed on surface of the substrate in a pattern shape was obtained.

(Evaluation of Dot Configuration)

Among the dots of the optical member obtained as described above, 10 dots were selected arbitrarily, and the shapes of the dots were observed using a laser microscope (manufactured by Keyence Corporation). The dot shape was a coffee-stain shape, the number of inflection points was 2, the dot center height Hc was 4.3 μm, and the dot maximum height Hmax was 5.8 μm. In addition, a value of the dot center height Hc/the dot maximum height Hmax was calculated and was 0.74. A value obtained by dividing the dot maximum height Hmax by the average dot diameter of 50 μm was 0.12. The number of inflection points was obtained as follows. Regarding one dot positioned at the center of the optical member as in the case of the observation with a scanning electron microscope, a surface of the dot including the dot center was cut in a direction perpendicular to the substrate to obtain a cross-section. In this cross-section, according to JIS B 0651:2001, a low pass filter was applied to a measured cross-section curve of the dot surface opposite to the substrate to obtain a cross-section curve, and a point at which the slope of the cross-section curve was 0 was set as an inflection point.

Regarding one dot positioned at the center of the obtained optical member, a surface including the dot center was cut in a direction perpendicular to the PET substrate, and the obtained cross-section was observed using the above-described scanning electron microscope. As a result, a stripe pattern including bright portions and dark portions was observed in the dot. An angle between a normal direction perpendicular to a line, which was formed using a first dark line from an air interface-side surface of the dot, and the air interface-side surface was measured. The angles measured at a dot end portion, at a portion between the dot end portion and the dot center, at the dot center were 90 degrees, 89 degrees, and 90 degrees, respectively. Further, regarding an angle between the normal direction perpendicular to the line formed using the dark line and a normal direction perpendicular to the PET substrate, the values measured at a dot end portion, at a portion between the dot end portion and the dot center, at the dot center were 35 degrees, 18 degrees, and 0 degrees, respectively, which were continuously decreased.

<Formation of Overcoat Layer>

A composition shown below was stirred and dissolved in a container held at 25° C. to prepare an overcoat layer-forming coating solution.

Overcoat Layer-Forming Coating Solution (Part(s) by Mass)
Acetone: 100.0
KAYARAD DPCA-30 (manufactured by Nippon Kayaku Co., Ltd.): 100.0
IRGACURE 819 (manufactured by BASF SE): 3.0

The overcoat layer-forming coating solution prepared as described above was applied to the underlayer, where the cholesteric liquid crystal dot was formed, using a bar coater in an application amount of 40 mL/m². Next, the overcoat layer-forming coating solution was heated such that the film surface temperature was 50° C., and then was dried for 60 seconds. Next, 500 mJ/cm² of ultraviolet light was irradiated using an ultraviolet irradiation device to promote a cross-linking reaction. As a result, an overcoat layer having a thickness of 25 μm was prepared. The optical member including the obtained overcoat layer was set as the optical member according to Example 1.

<Evaluation>
(Dot Maximum Height Hmax)

The dot maximum height Hmax of the obtained optical member according to Example 1 was evaluated according to the following standards. It is required in practice that the dot maximum height Hmax is evaluated as A or B, and it is preferable that the dot maximum height Hmax is evaluated as A.

(Evaluation Standards)
A: less than 6.0 μm
B: 6.0 μm or more and less than 20.0 μm
C: 20.0 μm or more The obtained results are shown in Table 1 below.

(Retroreflection Range)

Regarding the region of the obtained optical member according to Example 1 where the dots were disposed, using a visible and near-infrared light source (HL-2000, manufactured by Ocean Optics Inc.), an ultra high-resolution multi-channel fiber spectrophotometer (HR4000), and a 2-branched optical fiber, the reflection maximum wavelength was measured in 5 arbitrary visual fields having a diameter of 2 mm.

In the measurement, the reflection maximum wavelengths (reflection peak wavelengths) in all the visual fields of the optical member according to Example 1 were 850 nm. That is, it was found that the dot in the optical member according to Example 1 exhibited wavelength selective reflecting properties in which the reflection center wavelength was present in the infrared range.

In a case where the polar angle was changed in a range of 0 to 50 degrees when the normal direction perpendicular to the optical member was set as 0 degrees, a range (retroreflection range) where retroreflected light was able to be recognized by visual inspection was obtained. In all the visual fields of the optical member according to Example 1, retroreflection was constantly recognized from all the dots in a polar angle range of 0 to 50 degrees.

Regarding the retroreflection range, it is preferable that retroreflection was constantly recognized from all the dots in a polar angle range of 30° or higher, it is more preferable that retroreflection was constantly recognized from all the dots in a polar angle range of 40° or higher, it is still preferable that retroreflection was constantly recognized from all the dots in a polar angle range of 45° or higher, and it is even still more preferable that retroreflection was constantly recognized from all the dots in a polar angle range of 50° or higher.

(Proportion of Retroreflective Area During Observation after Light Irradiation from Oblique Direction)

The obtained optical member according to Example 1 was observed after irradiation of infrared light having a wavelength of 850 nm at a polar angle of 60° in one arbitrary orientation with respect to the normal direction perpendicular to the optical member. In this observation, a ratio of a retroreflective area to an orthogonal projection area of the dots was calculated. This calculated value was set as the proportion of a retroreflective area during the observation after light irradiation from the oblique direction, and was evaluated based on the following standards. It is required in practice that the proportion of a retroreflective area when the optical member was observed after light irradiation from the oblique direction was evaluated as A or B, and it is preferable that the proportion of a retroreflective area was evaluated as A.

(Evaluation Standards)
A: 30% or higher
B: 20%/a or higher and lower than 30%
C: lower than 20%

The obtained results are shown in Table 1 below.

(Number of Dot Surfaces Perpendicular to Direction which is Tilted from Normal Direction Perpendicular to Substrate to One Arbitrary Orientation by 60°)

Among the dots of the obtained optical member according to Example 1, 10 dots were selected arbitrarily, and the shapes of the dots were observed using a laser microscope (manufactured by Keyence Corporation). At this time, the number of surfaces perpendicular to a direction at a polar angle of 60° in one arbitrary orientation with respect to the normal direction perpendicular to the substrate of the optical member was counted. The number of the surfaces was 2. The obtained value was set as the number of dot surfaces perpendicular to a direction which was tilted from the normal direction perpendicular to the substrate to one arbitrary orientation by 60°.

The obtained results are shown in Table 1 below.

(Maximum Value of Front Surface Reflectance of Dots)

Further, in an optical microscope ECLIPSE-E600POL (manufactured by Nikon Corporation), a polarizer was removed from an optical path under epi-illumination conditions, IR80 (manufactured by Fuji Film Co., Ltd.) was inserted into a test plate slot of an intermediate lens barrel, and only reflected light in the near infrared range from the dots according to Example 1 was imaged using a digital microscope camera DXM1200. Based on the brightness of the obtained image, the maximum value of front surface reflectance of the dots was measured. The maximum value of front surface reflectance of the dots according to Example 1 was 41%.

The obtained results are shown in Table 1 below.

Examples 2 to 6

Optical members according to Examples 2 to 6 were prepared using the same method as in Example 1, except that the amount of the fluorine-containing compound in the Cholesteric liquid crystal ink solution, the stage temperature of the ink jet printer, and the dot jetting number of the ink jet were changed as shown in the table below.

Regarding each of the optical members according to Examples 2 to 6, the dot shape, the number of inflection points, the dot center height Hc, the dot maximum height Hmax, the dot center height Hc/the dot maximum height Hmax, the retroreflection range, the proportion of a retroreflective area during the observation after light irradiation from the oblique direction, the number of dot surfaces perpendicular to a direction which was tilted from the normal direction perpendicular to the substrate to one arbitrary orientation by 60°, and the maximum value of front surface reflectance of the dots were measured or calculated using the same methods as in Example 1. The obtained results are shown in Table 1 below.

Comparative Example 1

<Formation of Dot Having Cholesteric Structure>

A composition shown below was stirred and dissolved in a container held at 25° C. to prepare a cholesteric liquid crystal ink solution (liquid crystal composition used as a liquid crystal material).

Cholesteric Liquid Crystal Ink Solution (Part(s) by Mass)
Methoxyethyl acrylate: 145.0
Mixture 1 of rod-shaped liquid crystal compounds having the structures shown above: 100.0
IRGACURE 819 (manufactured by BASF SE): 10.0
Chiral agent 1 shown above: 3.8
Surfactant as a fluorine-containing low molecular weight compound having the following structure: 0.08

Surfactant as Fluorine-Containing Low Molecular Weight Compound

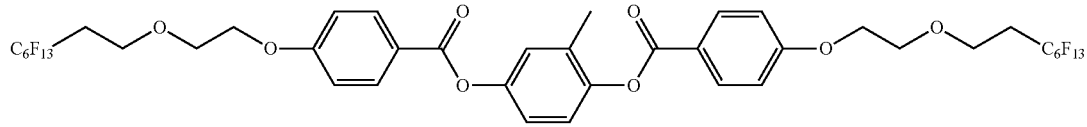

An optical member according to Comparative Example 1 was obtained using the same method as in Example 1, except that the cholesteric liquid crystal ink solution used in Example 1 was changed to the cholesteric liquid crystal ink solution prepared as described above.

<Evaluation>

Regarding the optical member according to Comparative Example 1, the dot shape, the number of inflection points, the dot center height Hc, the dot maximum height Hmax, the dot center height Hc/the dot maximum height Hmax, the retroreflection range, the proportion of a retroreflective area during the observation after light irradiation from the oblique direction, the number of dot surfaces perpendicular to a direction which was tilted from the normal direction perpendicular to the substrate to one arbitrary orientation by 60°, and the maximum value of front surface reflectance of the dots were measured or calculated using the same methods as in Example 1. The obtained results are shown in Table 1 below.

Figure 2:
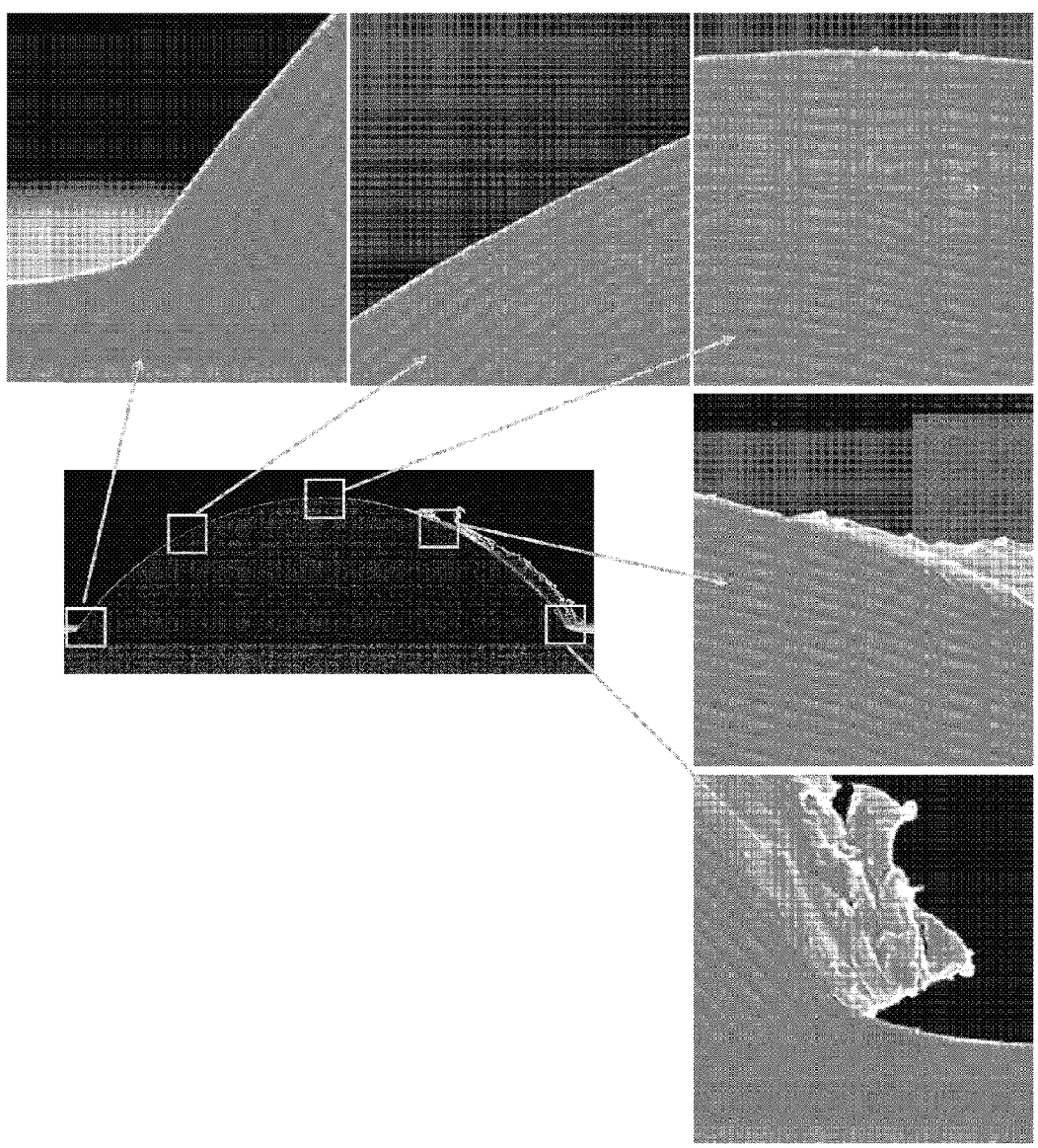
FIG. 2 is a diagram showing images of a cross-section of a dot of an optical member prepared in Comparative Example 1 when observed with a scanning electron microscope (SEM).

Regarding one dot positioned at the center of the optical member according to Comparative Example 1, a surface including the dot center was cut in a direction perpendicular to the PET substrate, and the obtained cross-section was observed using the above-described scanning electron microscope. As a result, a stripe pattern including bright portions and dark portions was observed in the dot, and a cross-sectional view shown in FIG. 2 was obtained (FIG. 2 is a cross-sectional view showing the optical member according to Comparative Example 1, and a portion present outside of a hemispherical shape on the right side of the cross-sectional view is a burr generated during cutting).

Comparative Examples 2 and 3

Optical members according to Comparative Examples 2 and 3 were prepared using the same method as in Comparative Example 1, except that the dot jetting number of the ink jet printer for forming one dot was changed as shown in Table 1 below.

Regarding each of the optical member according to Comparative Examples 2 and 3, the dot shape, the number of inflection points, the dot center height Hc, the dot maximum height Hmax, the dot center height Hc/the dot maximum height Hmax, the retroreflection range, the proportion of a retroreflective area during the observation after light irradiation from the oblique direction, the number of dot surfaces perpendicular to a direction which was tilted from the normal direction perpendicular to the substrate to one arbitrary orientation by 60°, and the maximum value of front surface reflectance of the dots were measured or calculated using the same methods as in Example 1. The obtained results are shown in Table 1 below.

TABLE 1

| | Manufacturing Conditions | | | Dot Configuration | | | | |
|---|---|---|---|---|---|---|---|---|
| | Content of Fluorine-Containing Compound in Liquid Crystal Material (Content of Liquid Crystal Compound expressed by mass %) | Stage Temperature | Dot Jetting Number | Dot Shape | Number of Inflection Points | Dot Center Height Hc [μm] | Dot Maximum Height Hmax [μm] | Dot Center Height Hc/Dot Maximum Height Hmax |
| Example 1 | 0.8 | 40° C. | 1 | Coffee-Stain | 2 | 3.6 | 5.8 | 0.62 |
| Example 2 | 0.8 | 40° C. | 10 | Coffee-Stain | 2 | 6.9 | 11.0 | 0.63 |
| Example 3 | 0.8 | 40° C. | 1 | Coffee-Stain | 2 | 3.2 | 5.8 | 0.55 |
| Example 4 | 0.8 | 60° C. | 1 | Coffee-Stain | 2 | 1.2 | 5.8 | 0.21 |
| Example 5 | 2.0 | 60° C. | 1 | Doughnut | 2 | 0.0 | 5.8 | 0.00 |
| Example 6 | 0.08 | 60° C. | 1 | Mexican Hat | 4 | 5.8 | 5.8 | 1.00 |
| Comparative Example 1 | 0.08 | 20° C. | 1 | Dome | 0 | 5.8 | 5.8 | 1.00 |

TABLE 1-continued

| | | | | | | | | |
|---|---|---|---|---|---|---|---|---|
| Comparative Example 2 | 0.08 | 20° C. | 10 | Dome | 0 | 11.0 | 11.0 | 1.00 |
| Comparative Example 3 | 0.08 | 20° C. | 50 | Dome | 0 | 22.0 | 22.0 | 1.00 |

| | Evaluation | | | | |
|---|---|---|---|---|---|
| | Dot Maximum Height | Retroreflection Range | Proportion of Retroreflective Area during Observation after Light Irradiation from Oblique Direction | Number of Dot Surfaces perpendicular to Direction which was tilted from Normal Direction perpendicular to Substrate to One Arbitrary Orientation by 60° | Maximum Value of Front Surface Reflectance of Dots |
| Example 1 | A | 50° or Higher | A | 2 | 41% |
| Example 2 | B | 50° or Higher | A | 2 | 43% |
| Example 3 | A | 50° or Higher | A | 2 | 41% |
| Example 4 | A | 45° | A | 2 | 41% |
| Example 5 | A | 45° | B | 2 | 41% |
| Example 6 | A | 50° or Higher | B | 3 | 41% |
| Comparative Example 1 | A | 30° | C | 1 | 41% |
| Comparative Example 2 | B | 45° | C | 1 | 45% |
| Comparative Example 3 | C | 50° or Higher | C | 1 | 46% |

It was found from Table 1 that, in the optical member according to each of the Examples, the proportion of a retroreflective area is high when the optical member is observed after light irradiation from a direction which is oblique to a normal direction perpendicular to the optical member.

In addition, the dot in the optical member according to each of the Examples had a cholesteric structure, and the cholesteric structure of the dot had a stripe pattern including bright portions and dark portions in a cross-sectional view of the dot when observed with a scanning electron microscope. In the cross-section of the dot in the thickness direction, an angle between a normal line perpendicular to a line, which was formed using a first dark portion from a surface of the dot opposite to the substrate, and the surface of the dot was in a range of 85° to 90°. In an end portion of the dot in the optical member according to each of the Examples, an angle between the surface of the dot, which was opposite to the underlayer, and the substrate was 29° to 60°. In the optical member according to each of the Examples, the non-polarized light transmittance (total transmittance) at a wavelength of 380 to 780 nm was 85% or higher when measured using a haze meter (manufactured by Nippon Denshoku Industries Co., Ltd.), and the optical member was transparent in the visible range.

In addition, in the optical member according to each of the Examples, the proportion of a retroreflective area during the observation after light irradiation from the oblique direction was the same even in a case where the irradiation angle of infrared light was changed from a polar angle of 60° to a polar angle of 45° with respect to the normal direction perpendicular to the optical member. In addition, in the optical member according to each of the Examples, the number of dot surfaces perpendicular to a direction which was tilted from the normal direction perpendicular to the substrate to one arbitrary orientation by 45° was the same as the number of dot surfaces perpendicular to a direction which was tilted from the normal direction perpendicular to the substrate to one arbitrary orientation by 60°.

On the other hand, it was found that, in the optical member in which a surface shape of the dot opposite to the substrate in a cross-section of the dot in a thickness direction did not have an inflection point, that is, in the optical member according to each of Comparative Examples 1 to 3 in which the number of inflection points in the dot was 0, the proportion of a retroreflective area was low when the optical member was observed after light irradiation from a direction which is oblique to a normal direction perpendicular to the optical member.

In particular, it was found from Comparative Example 1 that, in a case where a dot having no inflection point is formed at a dot jetting number of 1, the proportion of a retroreflective area was low when the optical member was observed after light irradiation from a direction which is oblique to a normal direction perpendicular to the optical member, and the angle of the retroreflection range was also low.

In particular, it was found from Comparative Example 3 that, in a case where a dot having no inflection point is formed at a dot jetting number of 50, the dot height was excessively high, and the proportion of a retroreflective area was low when the optical member was observed after light irradiation from a direction which is oblique to a normal direction perpendicular to the optical member.

Further, it was also found from a comparison between Comparative Examples 1 to 3 that, even in a case where the dot jetting number was increased from 1 to 10 or 50 so as to increase the dot maximum height, it is difficult to increase the proportion of a retroreflective area when the optical member was observed after light irradiation from a direction which is oblique to a normal direction perpendicular to the optical member. Although not shown in Table 1 above, in a case where the dot jetting number is increased to increase the dot maximum height, a retroreflective area (an area where retroreflection occurs) generally increases when an optical member is observed after light irradiation from a direction which is oblique to a normal direction perpendicular to the optical member. However, the configuration of increasing the dot jetting number and increasing the dot maximum height so as to increase a retroreflective area when an optical member is observed after light irradiation from a direction which is oblique to a normal direction perpendicular to the optical member is contrary to the demand to reduce the thickness of a dot, which is not preferable. In order to satisfy the demand to reduce the thickness of a dot, it is important to increase the proportion of a retroreflective area when an optical member is observed after light irradiation from a direction which is oblique to a normal direction perpendicular to the optical member.

INDUSTRIAL APPLICABILITY

A member in which an infrared reflection pattern is formed using the optical member according to the present invention can be used as a sheet mounted on a display front surface with an infrared reflection pattern which is applicable to a data input system in which data can be handwritten directly on a screen of an image display device. In addition, even in a case where the above-described member is used as an infrared reflection pattern-printed transparent sheet which can provide information regarding the position of the input terminal on the transparent sheet, an image close to the display screen itself can be obtained irrespective of the infrared reflection pattern by reading the infrared reflection pattern using an input terminal capable of irradiating and detecting infrared light. Therefore, the optical member according to the present invention is easy to use, has high practical performance, and can be used in various portable terminals such as a mobile phone or a PDA (Personal Digital Assistant) and various information processing devices such as a personal computer, a video telephone, a television having an intercommunication function, or an internet terminal. In particular, in the optical member according to the present invention, the proportion of a retroreflective area is high when the optical member is observed after light irradiation from a direction which is oblique to a normal direction perpendicular to the optical member. Therefore, the optical member according to the present invention can be used in combination with an electronic pen or the like which is used in a state where it is tilted obliquely to the optical member.

EXPLANATION OF REFERENCES

1: dot
1A: surface shape of dot
2: substrate
3: support
4: underlayer
5: overcoat layer
11: dot surface perpendicular to direction which is tilted from normal direction perpendicular to substrate to one arbitrary orientation by 60°
12: inflection point
100: optical member
105: display device
106: pen type input terminal
107: read data processing device
108: cord

What is claimed is:

1. An optical member comprising:
a substrate; and
a dot that is formed on a surface of the substrate,
wherein the dot has wavelength selective reflecting properties,
the dot has a cholesteric structure,
the cholesteric structure has a stripe pattern including bright portions and dark portions in a cross-sectional view of the dot when observed with a scanning electron microscope,
a surface shape of the dot opposite to the substrate in a cross-section of the dot in a thickness direction has at least one inflection point,
in the cross-section of the dot in the thickness direction, an angle between a normal line perpendicular to a line, which is formed using a first dark portion from a surface of the dot opposite to the substrate, and the surface of the dot is in a range of 70° to 90°, and
the number of dot surfaces perpendicular to a direction, which is tilted from the normal direction perpendicular to the substrate to one arbitrary orientation by 60°, of each dot is two or more.

2. The optical member according to claim 1,
wherein a maximum height of the dot is less than 20 μm.

3. The optical member according to claim 1,
wherein the following Expression 1 is satisfied, $$(Hc/Hmax)<1 \qquad \text{Expression 1}$$

in Expression 1, Hmax represents the maximum height of the dot, Hc represents a height at a center of the dot in the cross-section of the dot in the thickness direction, and the center of the dot is the center of gravity of an orthogonal projection of the dot from the normal direction perpendicular to the substrate.

4. The optical member according to claim 1,
wherein the following Expression 2 is satisfied, $$0.16<(Hc/Hmax)<1 \qquad \text{Expression 2}$$

in Expression 2, Hmax represents the maximum height of the dot, Hc represents a height at a center of the dot in the cross-section of the dot in the thickness direction, and the center of the dot is the center of gravity of an orthogonal projection of the dot from the normal direction perpendicular to the substrate.

5. The optical member according to claim 1,
wherein the following Expression 3 is satisfied, $$0.25<(Hc/Hmax)<1 \qquad \text{Expression 3}$$

in Expression 3, Hmax represents the maximum height of the dot, Hc represents a height at a center of the dot in the cross-section of the dot in the thickness direction, and the center of the dot is the center of gravity of an orthogonal projection of the dot from the normal direction perpendicular to the substrate.

6. The optical member according to claim 1,
wherein the dot is formed of a liquid crystal material having a cholesteric structure, and
the liquid crystal material includes a surfactant.

7. The optical member according to claim 6,
wherein the surfactant is a fluorine-containing polymer compound.

8. The optical member according to claim 6,
wherein the liquid crystal material is a material obtained by curing a liquid crystal composition including a liquid crystal compound, a chiral agent, and the surfactant.

9. The optical member according to claim 1,
wherein a plurality of the dots are provided in a pattern shape on the surface of the substrate.

10. The optical member according to claim 1,
wherein a diameter of the dot is 20 to 200 μm.

11. The optical member according to claim 1,
wherein in an end portion of the dot, an angle between a surface of the dot, which is opposite to the substrate, and the substrate is 27° to 62°.

12. The optical member according to claim 1,
wherein the dot has wavelength selective reflecting properties in which a center wavelength is present in an infrared range.

13. The optical member according to claim 12,
wherein the dot has wavelength selective reflecting properties in which a center wavelength is present at a wavelength of 800 to 950 nm.

14. The optical member according to claim 1 which is transparent in a visible range.

15. A method of manufacturing an optical member, the method comprising:
disposing a dot having wavelength selective reflecting properties on a surface of a substrate,
wherein the disposing a dot having wavelength selective reflecting properties is applying the composition which includes a liquid crystal material capable of forming a cholesteric structure to the surface of the substrate by an ink jet method, and
wherein the substrate is heated to a temperature of 40° C. or higher when the dot having wavelength selective reflecting properties on a surface of a substrate is disposed by applying the composition.

16. A method of manufacturing the optical member according to claim 1, the method comprising:
disposing a dot having wavelength selective reflecting properties on a surface of a substrate.

17. An optical member which is manufactured using the method according to claim 15.

18. An image display device comprising:
the optical member according to claim 1.

* * * * *